United States Patent
Lee et al.

(10) Patent No.: US 10,908,019 B2
(45) Date of Patent: Feb. 2, 2021

(54) SPECTROMETER AND SPECTRUM MEASUREMENT METHOD UTILIZING SAME

(71) Applicant: Samsung Electronics Co., Ltd., Suwon-si (KR)

(72) Inventors: Kyeong Seok Lee, Seoul (KR); Won Mok Kim, Seoul (KR); Gyu Weon Hwang, Seoul (KR); In Ho Kim, Seoul (KR); Wook Seong Lee, Seoul (KR); Doo Seok Jeong, Seoul (KR)

(73) Assignee: Samsung Electrionics Co., Ltd., Gyeonggi-do (KR)

( * ) Notice: Subject to any disclaimer, the term of this patent is extended or adjusted under 35 U.S.C. 154(b) by 105 days.

(21) Appl. No.: 16/069,241

(22) PCT Filed: Jul. 31, 2017

(86) PCT No.: PCT/KR2017/008256
§ 371 (c)(1),
(2) Date: Jul. 11, 2018

(87) PCT Pub. No.: WO2018/038413
PCT Pub. Date: Mar. 1, 2018

(65) Prior Publication Data
US 2019/0025120 A1    Jan. 24, 2019

(30) Foreign Application Priority Data

Aug. 22, 2016 (KR) .................. 10-2016-0106422
Apr. 26, 2017 (KR) .................. 10-2017-0053894

(51) Int. Cl.
*G01J 3/00* (2006.01)
*G01J 3/02* (2006.01)
(Continued)

(52) U.S. Cl.
CPC ........... *G01J 3/0229* (2013.01); *G01J 3/2803* (2013.01); *G01J 3/36* (2013.01); *G01J 3/453* (2013.01);
(Continued)

(58) Field of Classification Search
CPC ..... G01J 2003/2806; G01J 3/2803; G01J 3/36
See application file for complete search history.

(56) References Cited

U.S. PATENT DOCUMENTS 7,435,943 B1   10/2008 Chen et al.
8,879,152 B2   11/2014 Junger et al.
(Continued)

FOREIGN PATENT DOCUMENTS

CN   103733340 A   4/2014
CN   103868851 A   6/2014
(Continued)

OTHER PUBLICATIONS

International Search Report PCT/ISA/210 for International Application No. PCT/KR2017/008256 dated Dec. 4, 2017.
(Continued)

*Primary Examiner* — Dani Fox
(74) *Attorney, Agent, or Firm* — Harness, Dickey & Pierce, P.L.C.

(57) ABSTRACT

Present invention provides a spectrometer including a first unit spectral filter configured to absorb or reflect light in a part of a wavelength band of a light spectrum of an incident target, a second unit spectral filter configured to absorb or reflect light in a wavelength band different from the part of the wavelength band, a first light detector configured to detect a first light spectrum passing through the first unit spectral filter, a second light detector configured to detect a second light spectrum passing through the second unit spectral filter, and a processing unit configured to perform a
(Continued)

function of restoring a light spectrum of the target incident from spectra of light detected from the first light detector and the second light detector.

20 Claims, 19 Drawing Sheets

(51) Int. Cl.
*G01J 3/28* (2006.01)
*G01J 3/453* (2006.01)
*G02B 5/20* (2006.01)
*G01J 3/36* (2006.01)
*G01J 3/12* (2006.01)

(52) U.S. Cl.
CPC ...... *G02B 5/204* (2013.01); *G01J 2003/1213* (2013.01); *G01J 2003/1282* (2013.01); *G01J 2003/2806* (2013.01)

(56) References Cited

U.S. PATENT DOCUMENTS

| | | | |
|---|---|---|---|
| 2012/0156714 A1 | 6/2012 | O'Brien et al. | |
| 2014/0146207 A1* | 5/2014 | Yokogawa | G01J 3/2823 348/281 |
| 2016/0187254 A1 | 6/2016 | Cabib et al. | |

FOREIGN PATENT DOCUMENTS

| | | |
|---|---|---|
| CN | 105628199 A | 6/2016 |
| JP | 2005257358 A | 9/2005 |
| JP | 2008275600 A | 11/2008 |
| JP | 2013504051 A | 2/2013 |
| KR | 10-2013-0069714 A | 6/2013 |

OTHER PUBLICATIONS

Written Opinion of the International Searching Authority PCT/ISA/237 for International Application No. PCT/KR2017/008256 dated Dec. 4, 2017.

* cited by examiner

SPECTROMETER AND SPECTRUM MEASUREMENT METHOD UTILIZING SAME

CROSS-REFERENCE TO RELATED APPLICATIONS

This application is a national phase under 35 U.S.C. § 371 of PCT International Application No. PCT/KR2017/008256 which has an International filing date of Jul. 31, 2017, which claims priority to Korean Application Nos. 10-2016-0106422, filed Aug. 22, 2016 and 10-2017-0053894, filed Apr. 26, 2017, the entire contents of each of which are hereby incorporated by reference.

TECHNICAL FIELD

The present invention relates to a spectrometer, and more particularly, to a spectrometer using a spectroscopic filter having a stop band characteristic and a spectrum measurement method using the same.

BACKGROUND ART

Spectrometers using optical filters are used in various wavelength ranges such as visible light and infrared light. For example, the wavelength band used for infrared spectroscopy may be divided into a near-infrared region and a mid-infrared region. Hereinafter, a conventional art will be described using a mid-infrared spectrometer as an example.

The mid-infrared wavelength range (e.g., 2 mm to 20 mm) is the section in which the fundamental vibration mode of almost all the chemical molecules is present. Because it shows different infrared absorption spectra depending on the molecular bonding state, it is also an important wavelength band, which is also called the molecular fingerprint band. It has the advantages of being able to discriminate unknown samples regardless of solid, liquid, and gas, or to perform qualitative and quantitative analysis with high selectivity for specific target molecules.

The near-infrared region (e.g., 0.78 mm to 2 mm) is also the section in which a mode due to overtone and combination of the mid-infrared band fundamental vibration modes is present. Although its strength is low, a material may be identified or quantified. Even in the case of visible light (e.g., 0.38 mm to 0.78 mm), the inherent absorption spectrum of a material may be used for coloring objects, analyzing emitters, and detecting bio-molecules.

Conventionally, a benchtop type spectrometer such as a Fourier transform infrared (FTIR) spectrometer has been utilized as an organic/inorganic substance analyzing instrument. However, as attentions are gradually paid to various application fields such as food fields (for example, environmental harmful factor detection, water quality inspection, process control through monitoring of industrial and agricultural process lines, detection of residual pesticides, proof of origin, oil oxidation degree measurement, and the like) and medical bio fields, the demand for development of miniaturized devices for field measurement is increasing.

As the most effective way to miniaturize a spectrometer, there has been proposed a method in which an optical component for dispersing light is manufactured in the form of an array of an optical filter having a band filtering function instead of a conventional prism and a diffraction grating and integrated with the light detector array. Unlike the FTIR method, it is advantageous in that it is robust and easy to miniaturize because it does not require a moving object.

As a band-pass filter, a Fabry-Perot filter using a light interference effect of a dielectric resonator placed between two reflective films is typical. However, since the number of filters required for constituting the spectrometer is large and the number of litho process steps also increases by the number of dielectric resonance layers required therefor, it is disadvantageous in that it is suitable for application to a planar type spectrometer. To solve this issue, a linear variable filter (LVF) has been developed and used.

The LVF is an optical filter having a Fabry-Perot resonator structure, and has a structure in which the thickness of a dielectric resonance layer varies linearly in the length direction. In the LVF, a lower mirror layer and an upper mirror layer are disposed with a dielectric resonance layer interposed therebetween.

Such an LVF has a limitation in process reproducibility due to the linear structure whose thickness varies in the length direction. In addition, since the resolution of the conventional LVF spectrometer is determined by the height-to-length ratio of the LVF, it has been difficult to downsize the spectrometer. Particularly, due to the linear structure, the process compatibility with the two-dimensional imaging sensor technology is insufficient, so that it is disadvantageous in terms of productivity.

Since the transmission spectrum for each LVF location is made up of successive spectral overlaps and the integration between the LVF and the light detector is not monolithic, there is a distance between the filter and the array of light detectors and there is a drawback that the filter performance is deteriorated due to the stray light effect according thereto.

In addition, due to the nature of the interference filter, a multiple transmission mode occurs. Due to this, the free spectral range is limited, and a separate device is required when the broadband is analyzed.

In addition, since there is a limitation to the material system having a high transmittance in the spectrometer used for the mid-infrared wavelength band, the configuration of the interference optical filter is limited.

Also, there is an issue due to the interference effect with neighboring cells, and available materials are also limited.

DISCLOSURE OF THE INVENTION

Technical Problem

The present invention provides a spectrometer that controls a wideband only by controlling a horizontal structure and is advantageous for two-dimensional integration.

The present invention also provides a spectral filter array having excellent heat resistance and durability and a spectrometer using the same.

Technical Solution

Embodiments of the present invention provide a spectrometer including a first unit spectral filter configured to absorb or reflect light in a part of a wavelength band of a light spectrum of an incident target, a second unit spectral filter configured to absorb or reflect light in a wavelength band different from the part of the wavelength band, a first light detector configured to detect a first light spectrum passing through the first unit spectral filter, a second light detector configured to detect a second light spectrum passing through the second unit spectral filter, and a processing unit configured to perform a function of restoring a light spectrum of the target incident from spectra of light detected from the first light detector and the second light detector.

The unit spectral filters have a stop band characteristic. The stop band characteristic means that in unit spectral filters, a transmittance ratio according to wavelengths has a reverse peak in order to prevent light of a specific wavelength band from passing through. In addition, in another expression, this means that by absorbing light or reflecting light of a specific wavelength band corresponding to the central wavelength for each unit filter, a characteristic of a filter having a transmittance of a reverse peak according to a wavelength so as to prevent light of a specific wavelength band from going through. On the other hand, when the target spectrum is a peak function, the intensity distribution of the filter sequence number measured in the light detector is observed as a dip function, and if the target spectrum is a dip function, the light detector measurement profile is in the form of a peak function. That is, it may be expressed as a reverse form of the target spectrum, or may be determined by analogy from the intensity distribution in the neighboring wavelength band in the spectrum restoration process.

In an embodiment, the first unit spectral filter and the second unit spectral filter may include periodically arranged metal patterns with a predetermined shape and the metal patterns of the first unit spectral filter and the metal patterns of the second unit spectral filter may have different periods.

In an embodiment, the first light detector and the second light detector comprise some light detection pixels of a CMOS image sensor.

In an embodiment, the metal patterns may be composed of a material selected from the group consisting of Au, Ag, Al, Cu, or an alloy containing at least one thereof. For example, AgPd and CuNi alloys may be used.

In an embodiment, the metal patterns may be composed of at least one selected from the group consisting of Cr, Ni, Ti, Pt, Sn, Sb, Mo, W, V, Ta, Te, Ge, and Si, whose light absorption rate and refractive index are high in a visible light and near-infrared band, or an alloy containing at least one thereof. The metal patterns may be composed of at least one selected from the group consisting of Ta, W, Mo, Ni, Cr, TiN, and TiON, whose optical behaviors in a mid-infrared band follow the Drude free electronic model.

In an embodiment, the metal patterns may be composed of at least a double layer and laminate a low loss high reflectivity metal material and a light absorbing metal material. The low loss high reflectivity metal material may be selected from among Ag, Au, Al, Mg, and an alloy thereof, and the light absorbing metal material may include at least one of Cr, Ni, Ti, Pt, Sn, Sb, Mo, W, V, Ta, Te, Ge, and Si, an alloy thereof, and silicide, carbide, nitride, or sulfide containing these metals.

In an embodiment, the metal patterns of the first unit spectral filter and the metal patterns of the second unit spectral filter may have the same duty cycle.

In an embodiment, the periods of the metal patterns of the first unit spectral filter and the second unit spectral filter are between 100 nm and 800 nm. This is the preferred range for Si-based light detection element operating band or visible-near-infrared region (e.g., 380 nm to 1100 nm) spectrometer configuration. In nGaAs or Ge based near-infrared light detection element operating band (e.g., 800 nm to 1700 nm), the preferred period of metal patterns is between 0.6 um and 1.5 um. In the mid-infrared band (e.g., 2 um to 15 um), the period of the metal nanopatterns is between 0.8 um and 8 um.

In an embodiment, the first unit spectral filter and the second unit spectral filter may further include a passivation layer. The passivation layer may be composed of a material selected from $HfO_2$, $ZrO_2$, ZnO, ZnSe, $TiO_2$, $Al_2O_3$, $SiO_x$, SOG, or an alloy containing at least thereof.

In an embodiment, the first unit spectral filter and the second unit spectral filter may further include a protective layer. The protective layer may be a silicon oxide, a silicon nitride layer, a magnesium fluoride, a calcium fluoride, a low molecular resin, or a polymer material having a low refractive index.

In an embodiment, the processor unit may be configured to calculate an intensity of light absorbed or reflected by the first unit spectral filter from a spectrum of light of the first light detector, calculate an intensity of light absorbed or reflected by the second unit spectral filter from a spectrum of light of the second light detector, and restore a light spectrum of the incident target from the intensity of the light absorbed or reflected by the first unit spectral filter and the second unit spectral filter.

In other embodiments of the present invention, a spectrum measurement method using a spectrometer includes entering, by a light spectrum of a target, into first and second unit spectral filters, absorbing or reflecting, by the first unit spectral filter, light in a part of a wavelength band and absorbing or reflecting, by the second unit spectral filter, light in a wavelength band different from the part of the wavelength band, detecting, by a first light detector, a first light spectrum passing through the first unit spectral filter and detecting, by a second light detector, a second light spectrum passing through the second unit spectral filter, and reconstructing a light spectrum of the target incident from the spectra of the light detected from the first light detector and the second light detector.

In an embodiment, the reconstructing of the light spectrum of the target includes, calculating an intensity of light absorbed or reflected by the first unit spectral filter from a first light spectrum of the first light detector, calculating an intensity of light absorbed or reflected by the second unit spectral filter from a second light spectrum of the second light detector, and restoring a spectrum of an incident light from the intensity of the light absorbed or reflected by the first unit spectral filter and the second unit spectral filter.

In an embodiment, the reconstructing of the light spectrum of the target may use a direct readout or regularization technique.

In an embodiment, the reconstructing of the light spectrum of the target may be performed by substituting information on a transmission spectrum $f_i(\lambda)$ of an individual filter and a spectral sensitivity function $d_i(\lambda)$ of a light detector to an equation below and using a measured detection signal $r_i$.

$$\begin{bmatrix} r_1 \\ \vdots \\ r_i \\ \vdots \\ r_M \end{bmatrix} = \begin{bmatrix} D_1(\lambda_1) & \ldots & D_1(\lambda_N) \\ \vdots & \vdots & \vdots \\ D_i(\lambda_1) & \ldots & D_i(\lambda_N) \\ \vdots & \vdots & \vdots \\ D_M(\lambda_1) & \ldots & D_M(\lambda_N) \end{bmatrix} \begin{bmatrix} s(\lambda_1) \\ s(\lambda_2) \\ \vdots \\ \vdots \\ s(\lambda_N) \end{bmatrix} + \begin{bmatrix} n_1 \\ n_2 \\ \vdots \\ \vdots \\ n_M \end{bmatrix}$$

where $D_i(l)$ is $f_i(l)d_i(l)$, and when a spectrum of a target to be analyzed is $s(\lambda)$, a transmission function of an individual filter F is $f_i(\lambda)$, noise is $n_i$, and a sensitivity function of a light detector PD is $d_i(\lambda)$, is a detection signal occurring when a spectrum of a target reaches a light detector through a filter.

Advantageous Effects

According to the invention as described above, it is possible to provide a spectrometer easily integrated in two dimensions by a simple and inexpensive process.

Further, it is possible to realize a broadband operation range that covers the near-infrared and infrared wavelength bands from the visible light region.

Also, by adopting a single-stop band spectrometer, the design and manufacturing process of the spectral filter is simplified, the degree of freedom in selecting the metal material is expanded, and the filter function measurement and analysis are facilitated, so that the signal restoration capability is improved.

In addition, the reliability of the device may be improved by applying a material system capable of manifesting plasmonic characteristics in the mid-infrared band while having excellent long-term thermal stability and durability in the mid-infrared region.

MODE FOR CARRYING OUT THE INVENTION

Hereinafter, embodiments of the present invention are described in more detail with reference to the accompanying drawings. However, the following illustrative embodiment of the present invention may be modified into various other forms, and the scope of the inventive concept is not limited to the embodiments described below. The embodiments of the present invention are provided to enable those skilled in the art to more fully understand the present invention.

Figure 1:
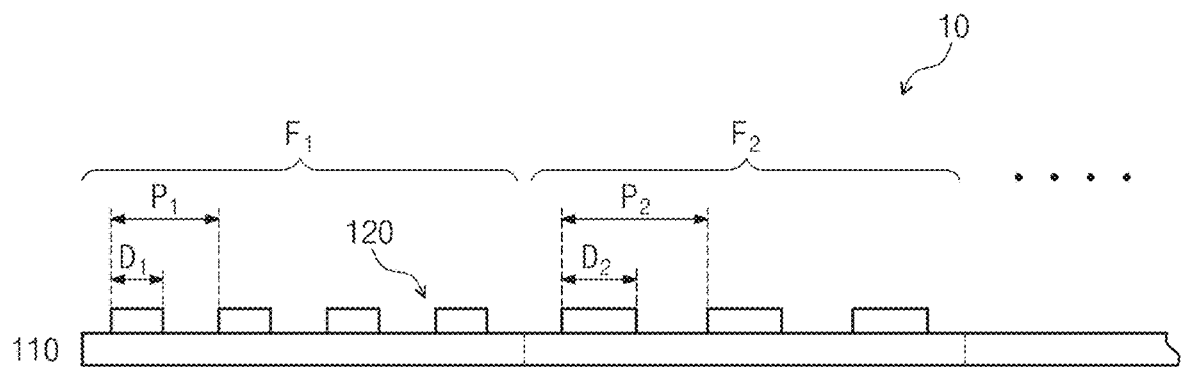
FIG. 1 is a spectral filter array according to an embodiment of the present invention.
Figure 2:
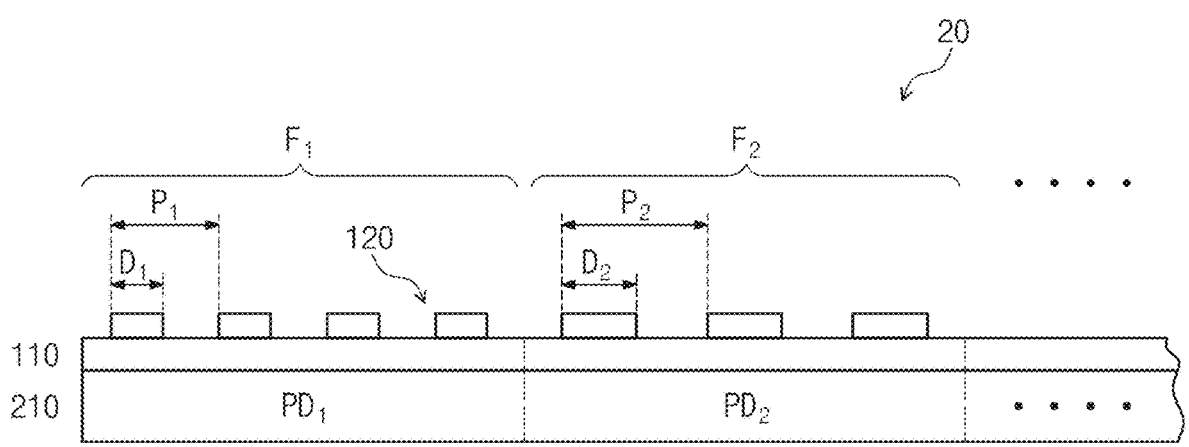
FIG. 2 is a view showing a part of a spectrometer using the spectral filter array.

FIG. 1 is a view showing a part of a spectral filter array according to an embodiment of the present invention, and FIG. 2 is a view showing a part of a spectrometer using the spectral filter array shown in FIG. 1.

A spectral filter array according to an embodiment of the present invention includes a plurality of unit spectral filters $F_1$ and $F_2$. The plurality of unit spectral filters $F_1$ and $F_2$ are configured to filter light of different wavelengths. A plurality of unit spectral filters refers to at least two unit spectral filters. A spectrometer 20 according to an embodiment of the present invention includes the spectral filter array 10 and is configured with a light detector array 210 including respective light detection regions $PD_1$ and $PD_2$ corresponding to the plurality of unit spectral filters $F_1$ and $F_2$. The plurality of unit filters $F_1$ and $F_2$ are configured to filter light of different wavelengths and the unit filters $F_1$ and $F_2$ corresponds to the light detection regions $PD_1$ and $PD_2$, respectively. A plurality of unit filters means at least two unit filters. Although it is shown in the example of FIG. 2 that the light detection regions $PD_1$ and $PD_2$ correspond to the unit filters $F_1$ and $F_2$ with the substrate 110 interposed therebetween, it should be understood that the provision of the unit filters $F_1$ and $F_2$ and the light detection regions $PD_1$ and $PD_2$ corresponding thereto means a situation in which the unit filters $F_1$ and $F_2$ is in direct contact with the light detection regions $PD_1$ and $PD_2$ and also includes a separate modular module form or a form in which an optical system such as a relay lens is inserted between the two modules.

The unit spectral filters $F_1$ and $F_2$ have a characteristic feature of using a stop band, and for example, are implemented with a plasmonics filter that periodically forms the metal patterns 120 to enable filtering.

The unit spectral filters $F_1$ and $F_2$ of FIG. 1 illustrate the implementation of the stop band through the structure in which the metal patterns 120 protruding in a predetermined shape (embossing) are periodically arranged.

The metal patterns may form an arrangement of metal nanostructures having a periodic lattice structure, and by coupling with localized surface plasmon and lattice mode, show enhanced extraordinary light absorption or light reflection phenomenon in a specific wavelength band. As a result, the spectrum of light transmitted through the array of metal nanostructures forms a dip curve in which transmittance is drastically lowered in a selective wavelength band where specific light absorption or light reflection is enhanced. This serves as a stop band when the transmitted light is used as a reference and the shape of the spectrum depends on the geometric structure such as the selection of the metal material and geometric structure such as periodicity and particle size of nanostructure array. In particular, the central wavelength has a characteristic dominantly determined by the lattice period.

Conventionally, a metal nano-hole array structure showing a transmission band with a plasmonic filter has been utilized. The metal nano-hole array structure shows an extraordinary optical transmission (EOT) phenomenon in which the light transmittance increases at a specific wavelength by coupling with a lattice mode and a surface plasmon wave traveling along the surface of the metal thin film. Unlike the metal nano-disk array structure, the metal nano-hole array structure is based on coupling between traveling waves, so that various modes exist and are not defined with a single transmission band. The presence of such a multimode may cause distortion in the process of processing signal wavelengths entering each light detection region during the filter array type spectrometer operation. Further, since it is required to generate a surface plasmon wave without attenuation proceeding along the surface of the metal thin film, it is difficult to use the light absorbing metal, and there is a limitation that the material system is limited by the low loss high reflectivity precious metal represented by Ag or Au. Furthermore, since these precious metal materials have a large dielectric constant in the mid-infrared band, there are disadvantages in that the structural design for forming a metal nano-hole array based transmission band filter is limited.

On the other hand, since the arrangement of the metal patterns made of the high-reflectivity metal material shows a reflection peak curve in a specific wavelength band by coupling with a lattice mode, it is used for a limited use such as a reflection type color filter or a decorative coating using reflected light. The present invention provides a spectrometer technique in which a metal nanostructure arrangement is not a reflective structure, but a transmissive structure with a light detector array arranged in the form of a stop band filter.

In the case of using a stop band formed by the arrangement of the plasmonic nanostructure in the visible light wavelength region and the infrared wavelength band, the present inventors confirm that the free spectral range, which is dependent on the period, is relatively wide so that it is advantageous in that the free spectral range covers the entire visible and infrared wavelength bands as compared with the transmission type band filter.

Also, when a spectrometer is composed of a transmission band in the infrared wavelength band, the present inventors confirm that the phenomenon of deterioration of characteristics occurs and in the case of the stop band filter, this problem may be solved. In this case, the mid-infrared band spectrometer may be defined to operate in a wavelength band of 2 μm to 15 μm, and more preferably, the spectrometer covers mid-infrared of 2.5 μm to 12 μm.

Meanwhile, a processing unit 330 (see FIG. 3) is separately provided to constitute a spectrometer. The processing unit uses the optical signal detected from the light detector array composed of the light detection regions PD1 and PD2, and reconfigures the spectrum of an incident light. This will be described in more detail later.

As a light detector array in the mid-infrared wavelength band, a one-dimensional array type infrared light detector using pyroelectric, thermopile, volometer, and photoconductive and photovoltaic type light detector elements or a two-dimensional array type infrared image sensor may be used. In the visible and near-infrared wavelength bands, a one-dimensional light detector array or a two-dimensional CMOS image sensor using a Si, Ge, InGaAs based light detection element may be used.

Alternatively, the periodic metal patterns 120 may be formed on a separate substrate 110 and then optically coupled to the light detector array and used or may be formed directly monolithic with a buffer layer (not shown) therebetween on the light detector array. The buffer layer (not shown) serves as a protective layer for each pixel of the light detector, and an optically transparent dielectric layer is preferred and may be a SiNx or $SiO_2$ layer. It is also possible to further provide an interfacial adhesion layer such as Ti, Cr, and transition metal oxide for the purpose of enhancing the adhesion with the upper metal pattern layer.

The substrate 110 may have various types without limitation, and may be a flexible light transmission substrate such as glass or polymer, Ge, GeSe, ZnS, ZnSe, sapphire, $CaF_2$, $MgF_2$, or the like. The flexible light transmission substrate is preferably composed of a transparent or translucent polymer having appropriate adhesive force and shock absorbing property. Specific examples of the polymer may be, without limitations, polystyrene (PS), expandable polystyrene (EPS), polyvinyl chloride (PVC), styrene acrylonitrile copolymer (SAN), polyurethane (PU), polyamide (PA), polycarbonate (PC), modified polycarbonate, poly (vinyl butyral), polyvinyl acetate, acrylic resin, epoxy resin (EP), silicone resin, unsaturated Polyester (UP), polyimide, polyethylene naphthalate, and polyethylene terephthalate. And these may be used singly or in combination of two or more. On the other hand, a silicon wafer is preferably used in the mid-infrared wavelength band, but is not limited thereto. When manufacturing a spectrometer that works effectively in the infrared region, it may be inadequate that the substrate itself absorbs much in the infrared band.

The metal material constituting the metal patterns 120 may be appropriately selected according to the wavelength band. This will be described in more detail.

First, a metal material having low loss and high reflectivity, which is widely used as a plasmonic metal, may be suitably used in a visible-near-infrared wavelength band and a mid-infrared wavelength band, and the metal patterns may be Au, Ag, Al, and Cu, which are plasmonic metals, an alloy of at least two thereof, or an alloy containing at least one thereof and containing other elements.

Next, in the visible light region and the near-infrared region, it may be Ti, Pt, Sn, Sb, Mo, W, V, Ta, Te, Ge, and Si, which are metals having large absorption coefficients and refractive indexes of light, an ally of at least two thereof, or an alloy containing at least one thereof and containing other elements.

In the mid-infrared region, it may be a material including at least one selected from the group consisting of Ta, W, Mo, Ni, Cr, TiN, and TiON, whose optical behavior follows the Drude free electronic model.

Figure 3:
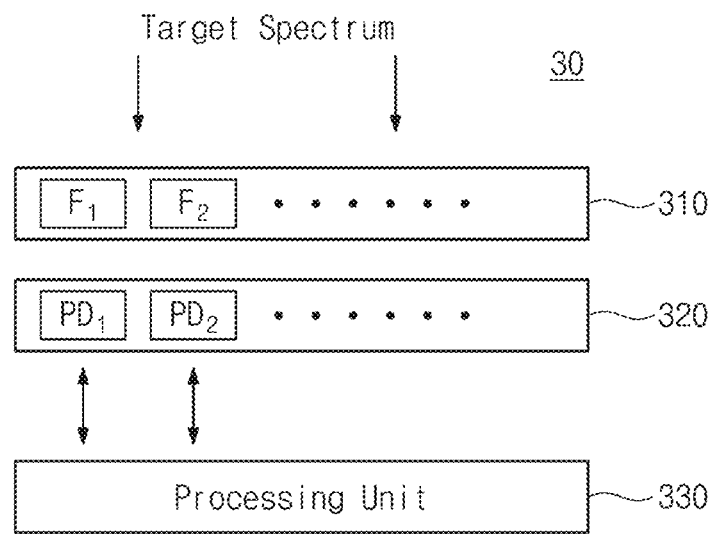
FIG. 3 is a block diagram of a spectrometer according to an embodiment of the present invention.

FIG. 3 is a block diagram of a spectrometer according to another embodiment of the present invention. Referring to FIG. 3, a spectrometer 30 includes a spectral filter array 310, a light detector array 320, and a processing unit 330. The spectral filter array 310 includes a plurality of unit spectral filters $F_1$ and $F_2$ for filtering light of different wavelength regions. The light detector array 320 includes light detection regions $PD_1$ and $PD_2$ corresponding to the plurality of spectral filters. The processing unit 330 performs a function of reconstructing the spectrum of the incident light using the optical signal detected from the light detector array 320. The plurality of unit spectral filters $F_1$ and $F_2$ are filters having a stop band characteristic as described above. The processing unit 330 according to the present invention serves as a spectrometer for restoring a target spectrum through application of a subsequent digital signal processing algorithm, and it is possible to implement a filter array-based spectrometer. This will be described in more detail later.

Figure 4:
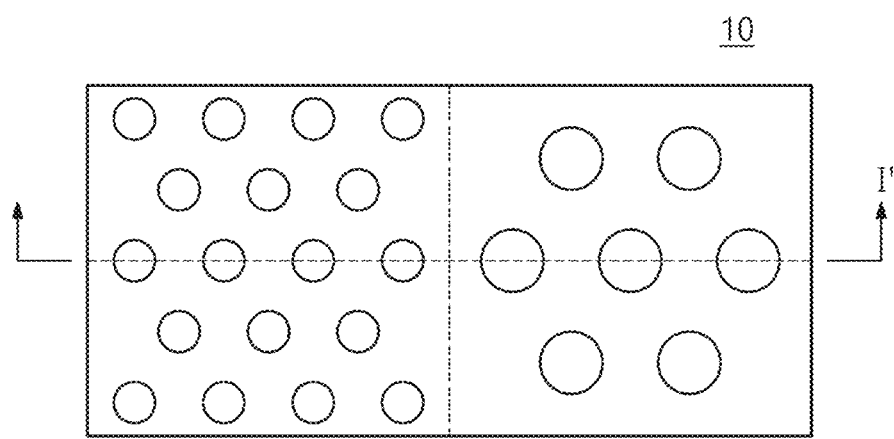
FIG. 4 is a plan view for explaining an array of spectral filters according to an embodiment of the present invention.
Figure 5:
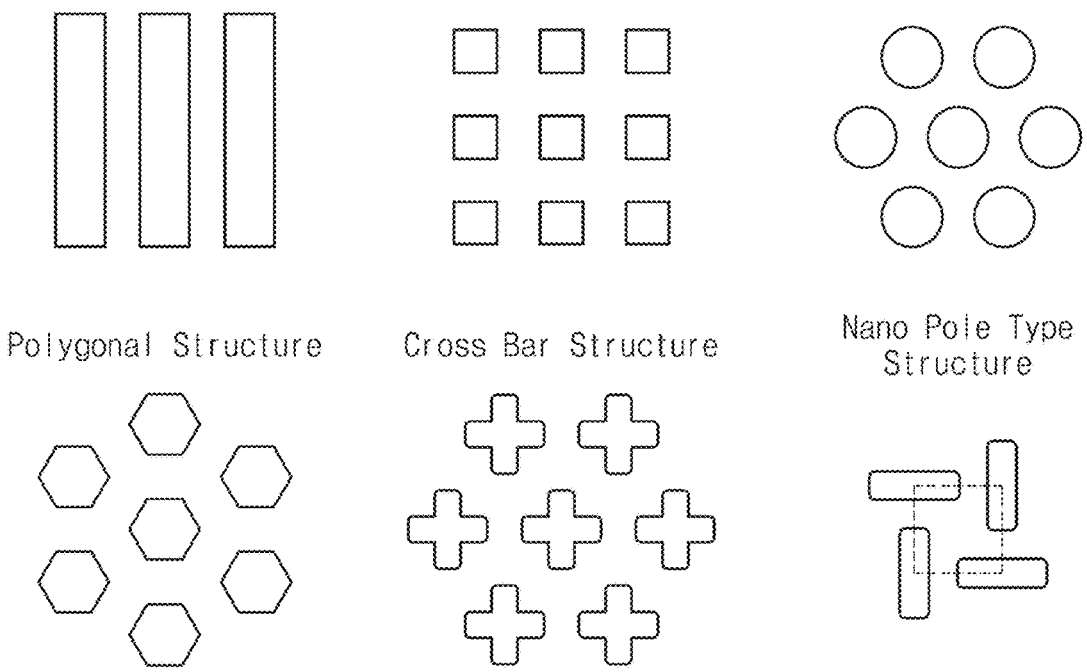
FIG. 5 is a view illustrating metal patterns of FIG. 4.

FIG. 4 is a plan view illustrating a spectral filter array according to an embodiment of the present invention. It is understood that a cross section taken along line I-I' in FIG. 4 is shown as in FIG. 1. FIG. 5 illustrates, by way of example, metal patterns of a spectral filter array. As shown in FIG. 5, both linear and two-dimensional lattice structures are applicable. The two-dimensional lattice structure may be a square lattice or hexagonal lattice structure. The shape of the metal nanostructure may be various shapes such as a square disk, a circular disk, a polygonal structure, a nanoscale unit structure, and a cross bar.

On the other hand, each unit spectral filter $F_1$ and $F_2$ has the same duty cycle or charge rate of the nanostructure. That is, if $D_1/P_1$ is a duty cycle in the unit spectral filter $F_1$, this value may have 30% to 80%. If the duty cycle is less than 30%, the size of a transmittance dip is very small, and if it exceeds 80%, a very broad dip curve tends to be generated.

In the unit spectral filter $F_2$, the duty cycle of $D_2/P_2$ remains the same as the duty cycle in the unit spectral filter $F_1$. However, it is characterized in that the periods of unit spectral filter $F_1$ and unit spectral filter $F_2$ are changed.

The factors determining the resonance wavelength of the unit spectral filters $F_1$ and $F_2$ are determined by the period, the shape of the metal structure, the thickness of the metal structure, the duty cycle, and the like. Here, the main factor determining the resonance wavelength is the period. When a spectrometer is manufactured using unit spectral filters $F_1$ and $F_2$, one of the advantages is that the resonance wavelength may be easily obtained through a relatively simple change of the element.

When a visible light wavelength region or a near-infrared wavelength band is targeted, the period of the metal patterns may be determined between 0.1 µM and 1.5 µM, and when a mid-infrared region is targeted, the period may be determined between 0.8 µm and 8 µm.

For example, when the mid-infrared band is targeted and Si having a large refractive index is used as a substrate, the period of the metal patterns may be determined between 0.8 µm and 4 µm. The thickness of the metal patterns may be from 5 nm to 500 nm, and may be more preferably from 10 nm to 300 nm. If the thickness is less than 5 nm, the ratio of free electrons scattered on the surface is increased to act as a large factor of the plasmon attenuation. If the thickness is more than 500 nm, multipole resonance occurs due to the volume increase effect, so that it becomes inadequate.

Figure 6:
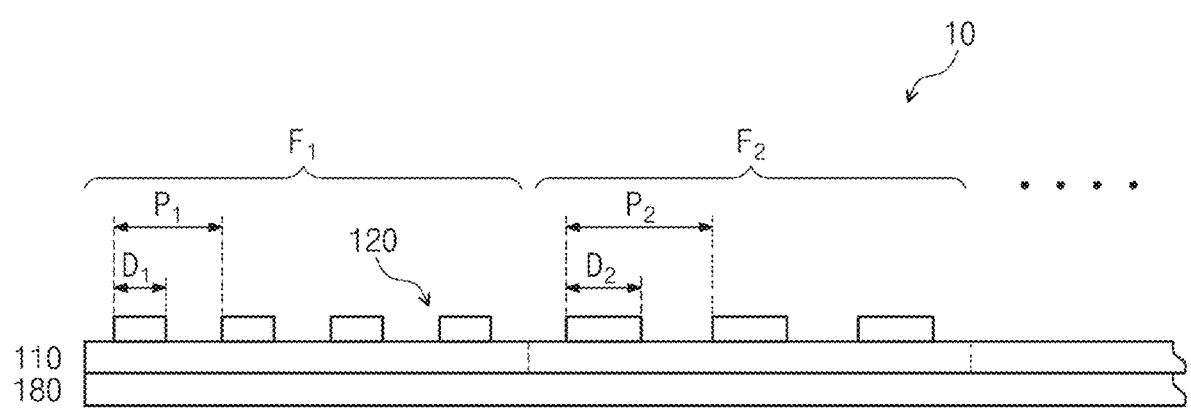
FIGS. 6 to 8 are diagrams showing spectral filters according to another embodiment.

FIG. 6 is a view showing an example of a spectral filter according to another embodiment. Referring to FIG. 6, a low-reflection coating layer 180 is additionally formed on a lower portion of a substrate 110 opposite to an upper portion of the substrate 110 where unit spectral filters $F_1$ and $F_2$ are formed.

The low-reflection coating layer 180 may be formed by coating a thin film layer having a refractive index satisfying a graded index condition between the substrate 110 and a neighboring medium, or with a nano-cone structure of a motheye shape. At this time, the coupling with the lower light detection region may be configured such that the periodic metal patterns face the lower light detector regions to allow light to be incident on the surface of the low-reflection coating layer. For example, since the refractive index of substrate materials showing high transmittance in the mid-infrared wavelength band is high except for some materials such as CaF2, in order to lower the reflection loss at the interface, a structure may be effective, in which the low-reflection coating layer 180 is additionally formed at a lower part of the substrate 110 opposite to an upper part where the periodic metal patterns 120 are formed.

Figure 7:
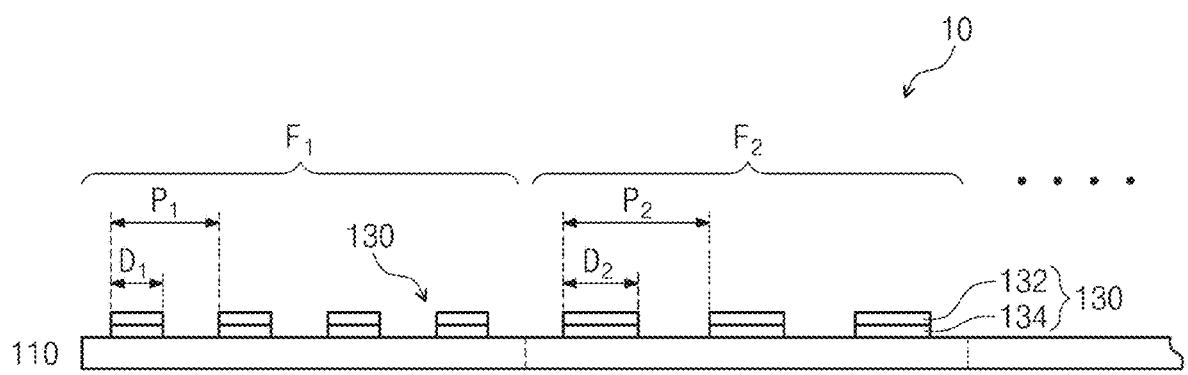

FIG. 7 is a view showing an example of a spectral filter according to another embodiment. Referring to FIG. 7, the metal patterns of FIGS. 1 and 2 are formed of a double layer 130. The double layer 130 may be composed of a double layer of a low loss high reflectivity metal material 134 and a light absorbing metal material 132. The metal material of low loss high reflectivity may be selected from among Ag, Au, Al, Mg and alloys thereof. Light absorbing metal materials include Cr, Ni, Ti, Pt, Sn, Sb, Mo, W, V, Ta, Te, Ge, and Si. Alloys between them, and silicides, carbides, nitrides, sulfides, etc. containing these metals are also possible.

For the purpose of improving the modulation depth of the stop band curve or improving the line width when using light absorbing metal materials, a relatively low-loss metal and a light-absorbing metal material may form a nano-disk array in the form of a double layer. In this case, as shown in FIG. 7, in relation to the stacking order, the light absorbing metal material 132 may be disposed on the low loss high reflectivity metal material 134 or on the contrary, the low loss high reflectivity metal material 134 may be disposed on the light absorbing metal material 132. Both structures are possible. It is also possible to construct a single layer in the form of an alloy between two materials instead of a double layer structure.

Figure 8:
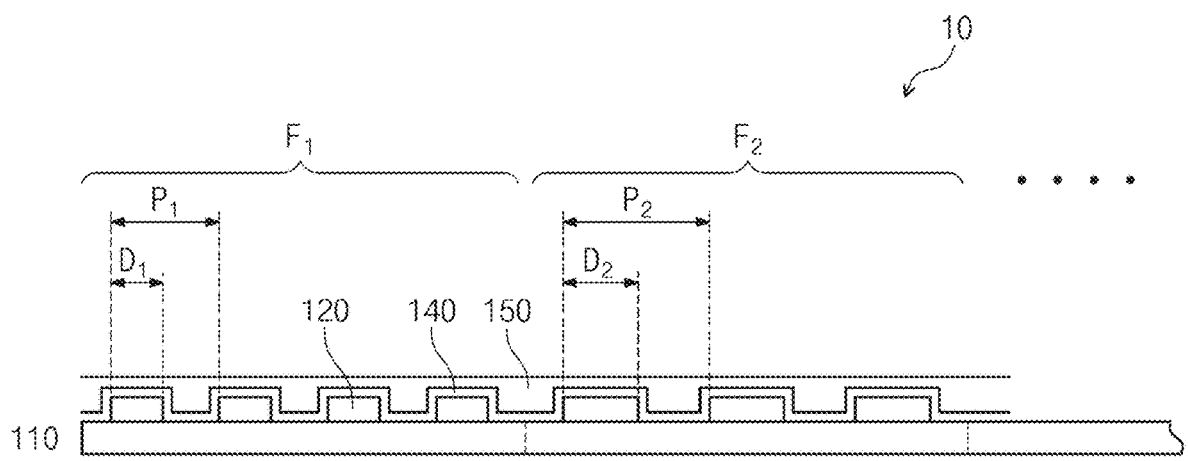

FIG. 8 is a view showing an example of a spectral filter according to another embodiment. Referring to FIG. 8, in constructing the spectral filter array 10 using metal nano-disks as the metal patterns 120, the passivation layer 140 is formed in a conformal manner for protection of the metal nano-disk layer. At this time, the passivation layer 140 is preferably formed with a thickness of 10 nm or less, and is more preferably formed with several nm or less, in order to minimize the influence on the optical characteristics of the nano-disk array filter.

The passivation layer 140 may be formed of at least one selected from $HfO_2$, $ZrO_2$, ZnO, ZnSe, $TiO_2$, $Al_2O_3$, SiOx, SOG and the like and may be formed using a metal surface oxidation method or an atomic layer deposition method.

A protective layer 150 such as a light transmission polymer and dielectric layer may be further provided on the passivation layer 140 as needed. It is also possible to provide only the upper protective layer 150 without the passivation layer 140.

The protective layer 150 may be silicon oxide, silicon nitride, magnesium fluoride, calcium fluoride, a low molecular weight resin, or a polymeric material. Examples of polymeric materials include polymeric materials including poly (dimethyl siloxane), polycarbonate, poly(vinyl phenyl sulfide), poly(methyl methacrylate), poly(vinyl alcohol), poly (vinyl butyral), and poly(methyl acrylate) and polymeric materials that are not particularly limited, including copolymers.

Figure 9:
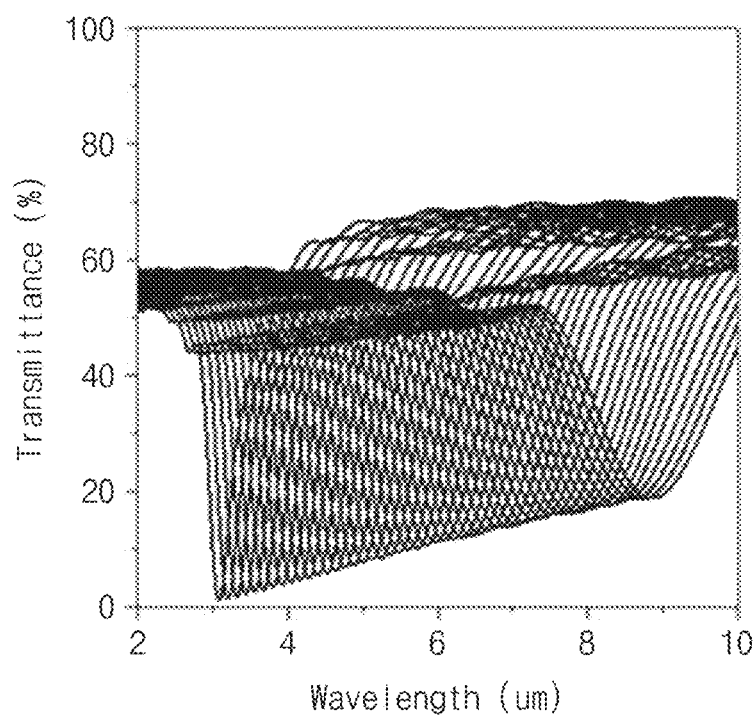
FIGS. 9, 10 and 11 are graphs showing simulation results of transmission characteristics of a stop band for several metal materials and patterns according to an embodiment of the present invention.
Figure 10:
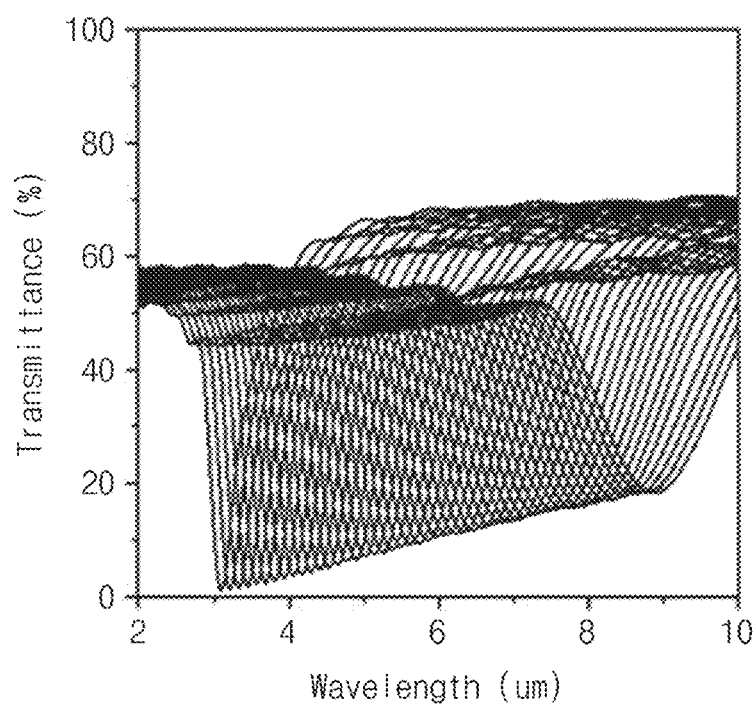
Figure 11:
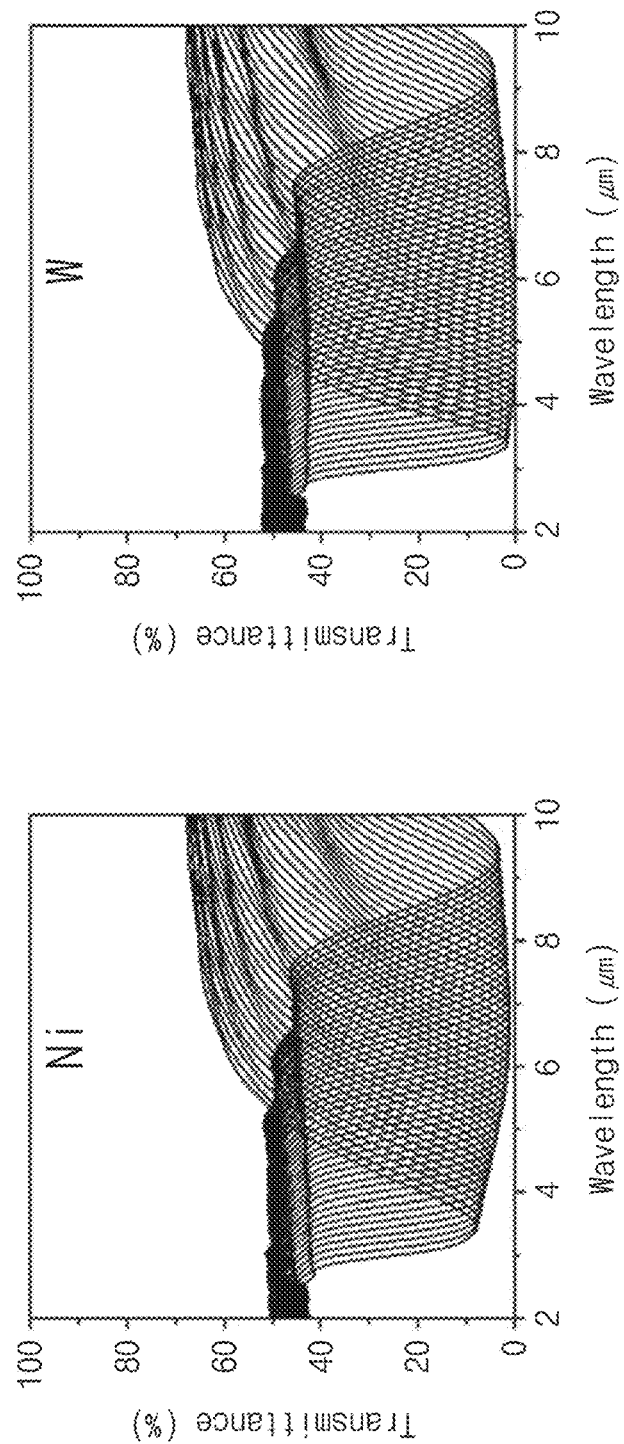

FIGS. 9, 10 and 11 are graphs showing simulation results of transmission characteristics of a stop band for several metal materials and patterns according to an embodiment of the present invention. A hexagonal lattice structure is assumed as the arrangement of metal nanostructure formed on a Si substrate, and this is a result that the period is calculated from 1 um to 2.92 um at intervals of 40 nm. The transmission characteristics of the stop band in a 2 µm to 10 µm band, which is the mid-infrared region, were simulated.

For a plasmonic filter array implementation, the type of material that forms the metal nanostructure array may be an important factor. In general, alkali and precious metal materials such as Al, Ag, Au, and Cu have been used as metal materials for generating the surface plasmon resonance phenomenon. According to the present invention, in addition to these metals, in the mid-infrared region, it is shown that transition metals such as Ta, W, Mo, Ni, and Cr, which follow the optical behavior of the Drude free electronic model, and metal nitrides such as TiN and TiON are effective as stop band nano-disk array filter materials.

In particular, these materials are preferred for mid-infrared wavelength band materials because of their excellent thermal and mechanical stability. In addition, these materials additionally have an advantage that the adhesive strength to the substrate is very high, so that no additional adhesive layer is required. The metal nitride has the advantage that additional control of the optical properties is possible through composition control.

FIGS. 9 and 10 show transmittance dip curves through a theoretical computational simulation after a nano-disk having a duty cycle of 50% is formed with a metal pattern using Au and Ta. FIG. 11 shows a result of simulating a light transmittance curve after a nano-disk having a duty cycle of 60% is formed of a metal pattern using Ni and W.

In FIGS. 9, 10, and 11, although there is a slight difference in spectral shape depending on the kind of the metal material in the mid-infrared band of about 3 µm to about 10 µm, it may be confirmed that the center wavelength of the single-stop bands is continuously variable and covers the entire range. Among the transition metals, Ta, W, and Mo, which are classified as heat-resistant metals, are characterized in that the optical constant dispersion characteristics in the mid-infrared range are very similar to Au.

On the other hand, Ni and Cr have a characteristic that the real number of the refractive index has a relatively high value in a short wavelength but as it goes toward longer wavelengths, a value lower than a heat-resistant metal is maintained. Therefore, although it is not suitable for a nano-hole array structure using excitation of surface plasmon waves traveling along the surface of a thin film, a nano-disc type stop band filter using a specific light absorption or light reflection phenomenon, as coupled with a lattice mode, may be very usefully used.

Alkali and precious metals such as Al, Ag, and Au generally used as plasmonic metal materials may have a problem that insufficient heat resistance may occur in an infrared region where a light source is used and a thermally excited state is expected due to the plasmon resonance effect.

Figure 12:
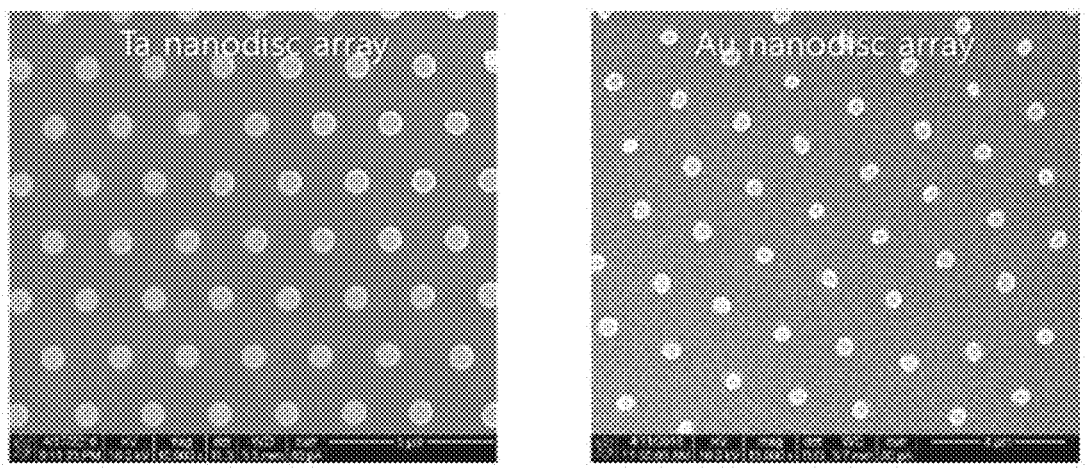
FIG. 12 is a scanning electron microscope image showing the thermal stability according to the selection of a metal material constituting the nanostructure array.

FIG. 12 is a scanning electron microscope image showing the thermal stability according to the selection of a metal material constituting the nanostructure array. In order to confirm the heat resistance, 50 nm thick Ta and Au nano-disk array patterns are formed on the Si substrate, and the shape changes are compared after heat treatment. Although manufactured with the same template, it may be seen that the shape after vacuum heat treatment at 900° C. for 30 min is maintained without change in the Ta nano-disk, but in the case of Au and spherical particles are formed by self diffusion. Ag, which has a lower melting point and a higher atomic mobility than Au, is expected to have stability problems at much lower temperatures.

The fundamental vibrations of the molecules represent the absorption mode by combination with harmonics in the near-infrared region band (e.g., 0.78 µm to 2 µm). These harmonic and combinatorial vibration modes have a disadvantage in that they have smaller intensity and larger absorption line widths than the mid-infrared band, but the light source and detector are well-developed regions and become a highly effective spectral region. The infrared stop band filter according to the present invention may also operate as a near-infrared spectrometer by moving the wavelength band to the near-infrared region.

Figure 13:
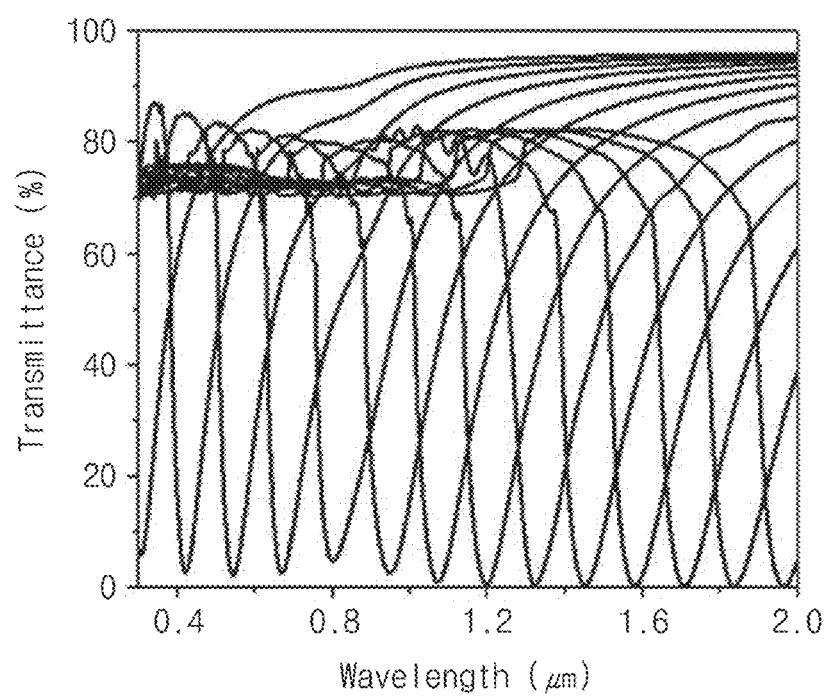
FIG. 13 is a computer simulation result showing that the free spectral range of the metal nano-structured array type stop band filter according to the present invention may extend to a visible light wavelength region as well as a near-infrared band.

FIG. 13 is a computer simulation result showing that the free spectral range of the metal nano-structured array type stop band filter according to the present invention may extend to a visible light wavelength region as well as a near-infrared band.

When an Al nano-disk array with a thickness of 50 nm has a hexagonal lattice structure, the transmission spectrum is calculated by changing the period from 200 nm to 1500 nm at intervals of 100 nm. Here, the duty cycle is fixed at 50%. It may be seen that a single stop band characteristic continuously changes from 0.35 µm to 2 µm.

The spectral filter array of the present invention may be formed on a substrate and manufactured as a separate spectral filter module. The substrate may be used without restriction if it is a transparent material in each wavelength band at an operating wavelength, and may be glass or a polymer as described above. For example, a light transmission film is used as a substrate, and the light transmission film is preferably composed of a transparent or translucent polymer having appropriate adhesive force and shock absorption property. The spectral filter module is manufactured in a non-integrated form of the light detector array, and may be used by attaching it to the light detector array module in actual use. When the spectral filter module is attached to the light detector in actual use, for example, it is possible to use it by coupling to the optical filter module in front of the lens of the camera.

Figure 14:
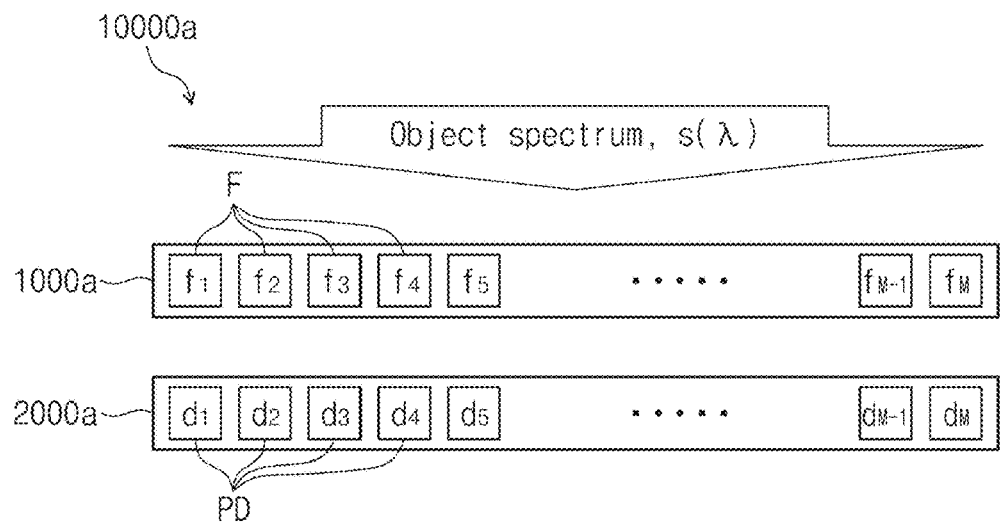
FIG. 14 shows an example of constructing a spectrometer through one-dimensional linear arrangement coupling between a spectral filter array and a light detector array of the present invention.

FIG. 14 shows an example of constructing a spectrometer 10000a through one-dimensional linear arrangement coupling between a spectral filter array 1000a and a light detector array 2000a of the present invention.

The schematic diagram in FIG. 14 shows a spectrometer 10000a including a light detector array 2000a consisting of M spectral filters F and a spectral filter array 1000a consisting of M light detection regions PD. The period of each unit spectral filter F may be determined to match the period of the light detection region PD of the associated one-dimensional linear arrangement light detector array or to match the size of a group of the plurality of light detection regions PD. That is, the combination of the unit spectral filter and the light detection region may be a 1:1 or 1:N (where N is 2 or more) combination.

Figure 15:
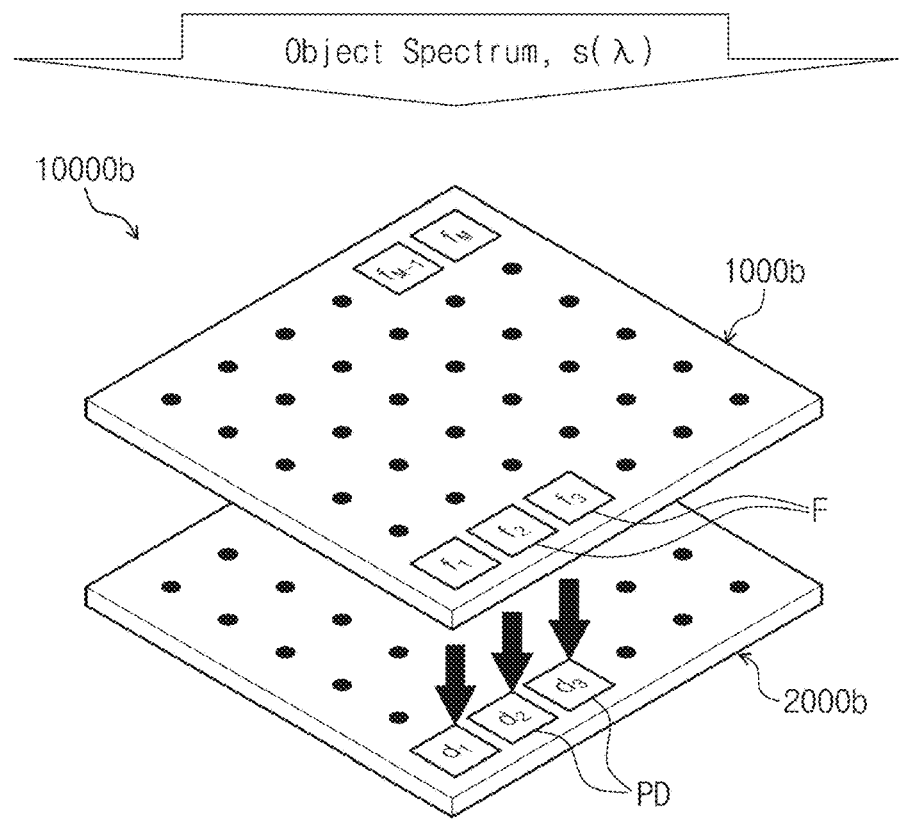
FIG. 15 shows an example of configuring a spectrometer through a two-dimensionally arranged coupling between a filter array and a light detector of the present invention.

FIG. 15 shows an example of configuring a spectrometer 10000b through a two-dimensionally arranged coupling between a spectral filter array 1000b and a light detector array 2000b of the present invention. It is more advantageous in integration than the one-dimensionally coupled spectrometer 10000a, and is advantageous for coupling with conventional CMOS image sensors, thermal cameras and the like.

Meanwhile, the spectrometers 10000a and 10000b of FIGS. 14 and 15 include the spectral filter arrays 1000a and 1000b and the light detector arrays 2000a and 2000b of the present invention. The spectrometers 10000a and 10000b may be spectrometer chips.

In the spectrometers 10000a and 10000b of the present invention, the spectral filter arrays 1000a and 1000b may be composed of a plurality of unit spectral filters F. The details of the spectral filters F are described above. The plurality of spectral filters F may form a stop band characteristic in which the center wavelength is continuously variable to form a stop band filter array structure.

The light detector array 2000a is arranged such that a plurality of light detection regions PD correspond to the plurality of unit spectral filters F, and the light detector array 2000a is installed to detect light passing through each unit spectral filter. The light detector array 2000a is disposed at a predetermined distance from the spectral filter array 1000a. In another modification, it is of course possible to fabricate the light detector array 2000a in direct contact with the spectral filter array 1000a. The light detection region PD may be a unit pixel.

In measuring the target spectrum, the spectrometers 10000a and 10000b according to the present invention enable the output of subtractive intensity of light incident through a stop band filter whose center wavelength is shifted little for each position in one direction of the spectral filter. Because of this, the intensity distribution according to the wavelength of light appears to be opposite to that of the conventional transmission band filter array based spectrometer. The application of the subsequent digital signal processing algorithm serves as a spectrometer to restore the target spectrum, and it becomes possible to implement a filter array based spectrometer. The processing unit 330 of FIG. 3 performs an integral function of reconstructing the spectrum of the incident light using the optical signal detected from the light detector array.

Figure 16:
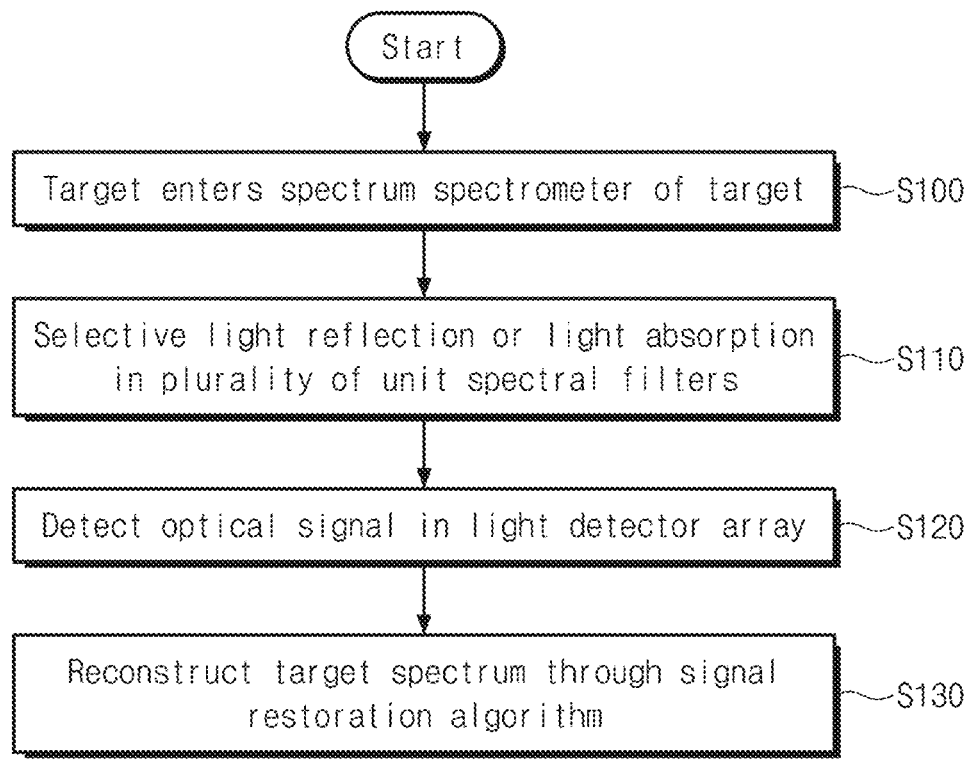
FIG. 16 is a flowchart for explaining a spectroscopic method of the present invention.

Hereinafter, a spectroscopic method using a spectrometer according to an embodiment of the present invention will be described. FIG. 16 is a flowchart of a spectroscopic method according to an embodiment of the present invention.

First, a target spectrum enters a spectrometer (S100). The spectrometer includes a spectral filter array and a light detector array with light detection regions corresponding to respective unit spectral filters.

The spectrum of the incident target selectively reflects light or absorbs light through the spectral filter array (S110). This characteristic is a characteristic of the above-mentioned "stop band" filter, and unit spectral filters exhibit a characteristic that the transmittance ratio according to the wavelength has a reverse peak to prevent light of a specific wavelength band from passing through.

Next, a light spectrum signal transmitted through the spectral filter array is detected in the light detector array (S120). Then, the spectrum of the target is restored by the signal restoration algorithm (S130).

The principle of signal restoration in a spectrometer based on a stop band filter array according to the present invention will be described mathematically with reference to FIG. 14.

When the spectrum of the target to be analyzed is s(λ), the transmission function of individual spectral filters is $f_i(\lambda)$, and the sensitivity function of the optical detector is $d_i(\lambda)$, the detection signal ri, which is generated when the spectrum of the target reaches the optical detector through the filter, is expressed by the following relational expression (1), and is expanded into a determinant expressed by the discretized model.

$$r_i = \int_\lambda f_i(\lambda_j)d_i(\lambda_j)s(\lambda_j)d\lambda_j = \int_\lambda D_i(\lambda_j)s(\lambda_j)d\lambda_j \quad (1)$$

$$\begin{bmatrix} r_1 \\ \vdots \\ r_i \\ \vdots \\ r_M \end{bmatrix} = \begin{bmatrix} D_1(\lambda_1) & \cdots & D_1(\lambda_N) \\ \vdots & \vdots & \vdots \\ D_i(\lambda_1) & \cdots & D_i(\lambda_N) \\ \vdots & \vdots & \vdots \\ D_M(\lambda_1) & \cdots & D_M(\lambda_N) \end{bmatrix} \begin{bmatrix} s(\lambda_1) \\ s(\lambda_2) \\ \vdots \\ s(\lambda_N) \end{bmatrix} + \begin{bmatrix} n_1 \\ n_2 \\ \vdots \\ n_M \end{bmatrix} \quad (2)$$

In general, the linear algebra of Equation (2) results in an ill-posed problem because the number M of filters is smaller than the number N of wavelength samples. Since there is no explicit inverse matrix of D(λ) with MXN (M<N) size, a pseudo inverse may be used to recover the spectral signal, but it is very vulnerable to small fluctuations and system noise, resulting in unstable results.

The regularization technique is used to obtain a more effective and numerically stable solution. The Tikhonov regularization technique may be used as the most representative method. This method restores the spectrum of the target to be analyzed by determining the solution Sα that minimizes the sum of the residual norm and the side constraint norm as shown in Equation (3). Here, α is a regularization factor that determines the weight of the side constraint minimization with respect to the residual norm minimization, and there is an optimum value for obtaining a robust solution.

$$s_\alpha = \arg\min\{\|Ds-r\|_2^2 + \alpha^2\|L(s-s^*)\|_2^2\} \quad (3)$$

By using a singular value decomposition (SVD) and L-curve analysis method, it is possible to apply it to the system to determine the optimal regularization factor and to enable real-time spectrum restoration.

The L-curve analysis method is a method of taking the corner value of the L-curve with the optimum a value, in which when increasing and substituting the α value gradually to obtain the solution of the Tikhonov regularization equation and after this solution is substituted into the residual norm $\|DS-r\|_2^2$ and solution norm) $\|L(S-S^*)\|_2^2$ and then expressed in the coordinate axis of the log scale, an L-curve graph is obtained.

The method of obtaining the corner value is to determine a with the smallest radius of curvature by taking the log scale value of the residual norm and solution norm as variables. The target spectrum may be restored by substituting the obtained α value into Tikhonov regularization again to obtain Sα.

Using this regularization technique, it is possible to restore the spectral spectrum with a relatively high resolution while using a non-ideal filter array having a wide half width. The signal restoration algorithm is not limited to the illustrated regularization method, but various techniques may be applied.

Figure 17:
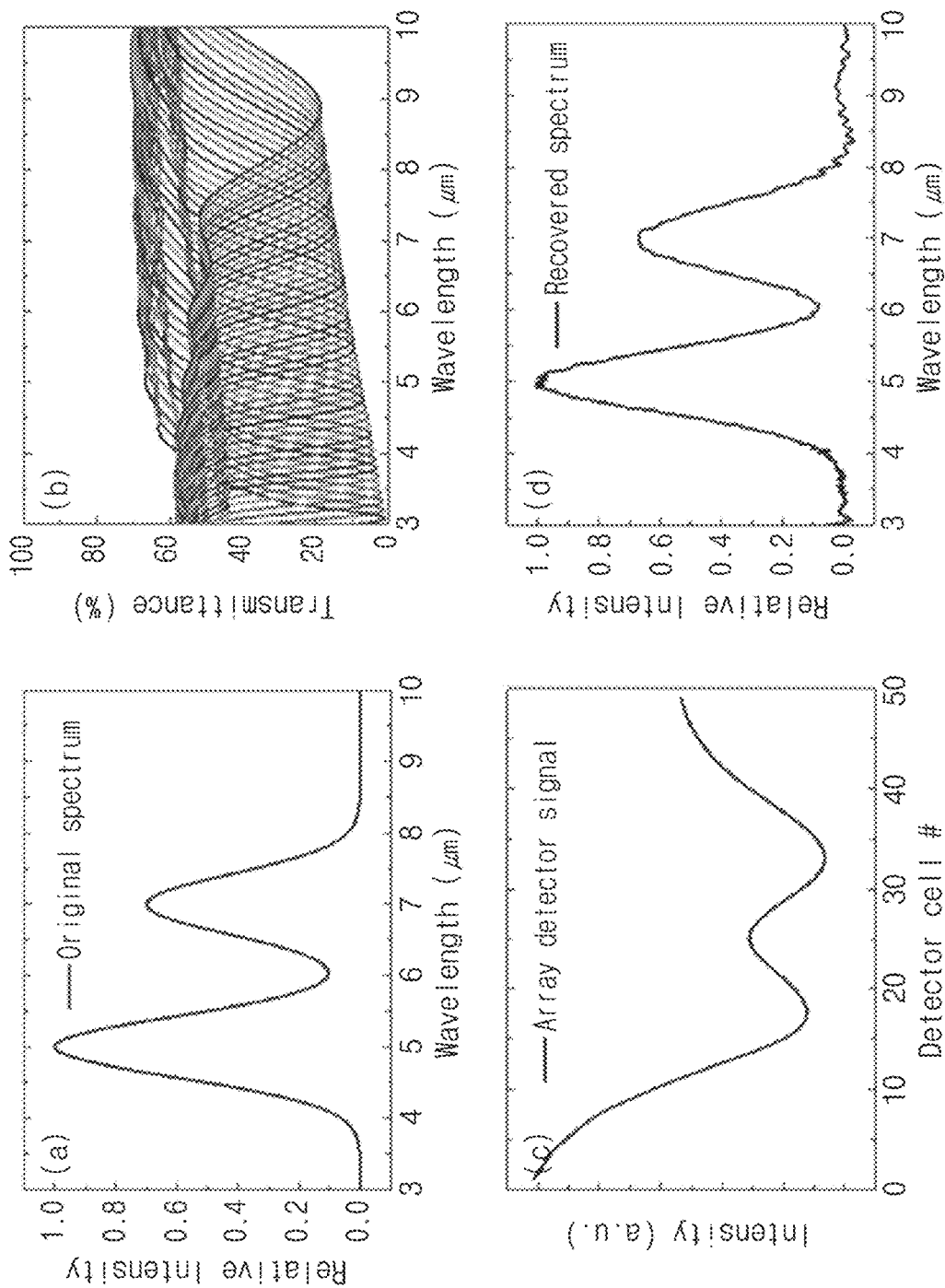
FIG. 17 shows a digital signal processing process for restoring a target spectrum for a spectrometer operation using an applied infrared optical filter according to an embodiment of the present invention.

FIG. 17 shows an example of a calculation result explaining a signal restoration principle of a spectrometer using the plasmonic stop band filter array according to the present invention.

The target spectrum to be analyzed is assumed to have two separate peaks as shown in the upper left image. When the target spectrum passes through the stop band type filter array shown on the upper right, the intensity distribution that passes through each filter and is measured in the light detector array is determined by Equation (1) and is affected by the filter function and shows a distorted or unclear reverse distribution. At this time, if the digital signal processing algorithm of Equation (3) is performed after substituting the information on the transmission spectrum fi($\lambda$) of the individual filter and the spectral sensitivity function di($\lambda$) of the light detector to Equation (2), it is possible to accurately restore the target spectrum as shown in the lower left. The transmission spectrum fi($\lambda$) of the individual filter may use a value measured in advance using an optical system for each filter region (for example, measure a value in advance using a spectroscopic microscope for each filter region). The spectral sensitivity-function di($\lambda$) of the light detector may use a value provided by the manufacturer or it is possible to use a monochromator to measure the ratio of the detector output intensity to the light source intensity for each wavelength and use it. Alternatively, while the wavelength of the incident light is changed through a monochromator in a state where it is combined with or integrated with the light detector array, it is also possible to directly measure and use the value of Di($\lambda$), which is the intensity distribution that reaches the light detector region through each filter region for each wavelength.

Since the intensity distribution measured in an actual light detector array includes system noise and the like, it is desirable to add a noise cancellation algorithm to stabilize the restored signal.

Since the plasmonic filter is able to change the resonance wavelength in the broadband range only by the adjustment of the two-dimensional horizontal structure without vertical structure modification, with only a low-cost single layer process using photolithography or nanoimprinting, there is an advantage that a highly integrated band stop filter array having different spectroscopic characteristics may be formed.

Figure 18:
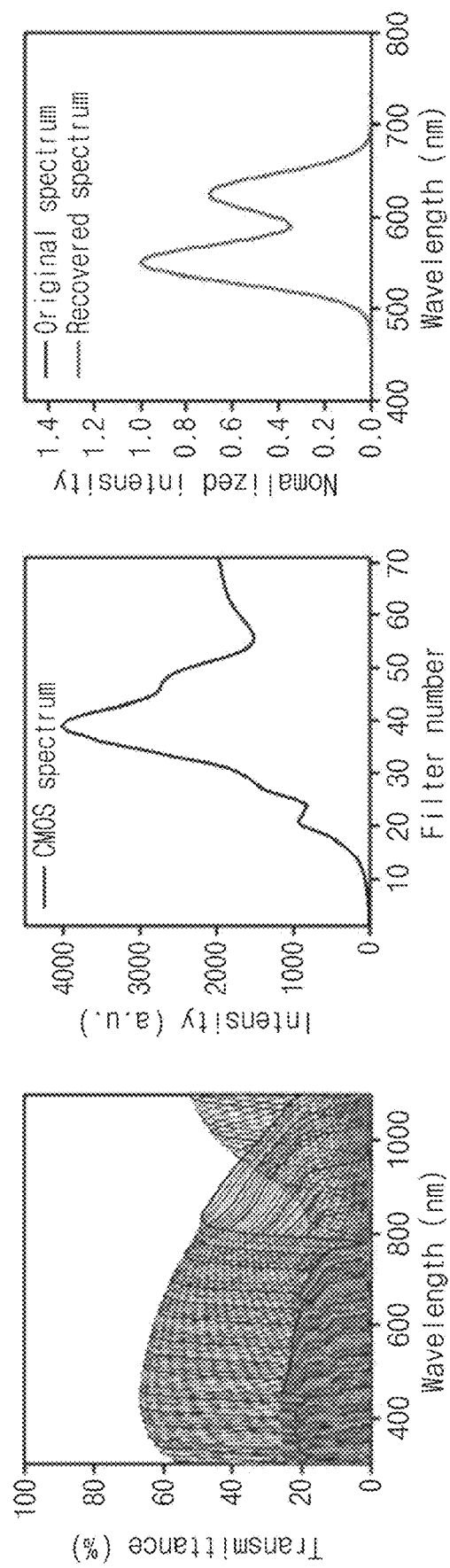
FIGS. 18 and 19 are graphs for comparing the transmission band-type filter array and the stop band-type filter array in a visible-near-infrared wavelength band.
Figure 19:
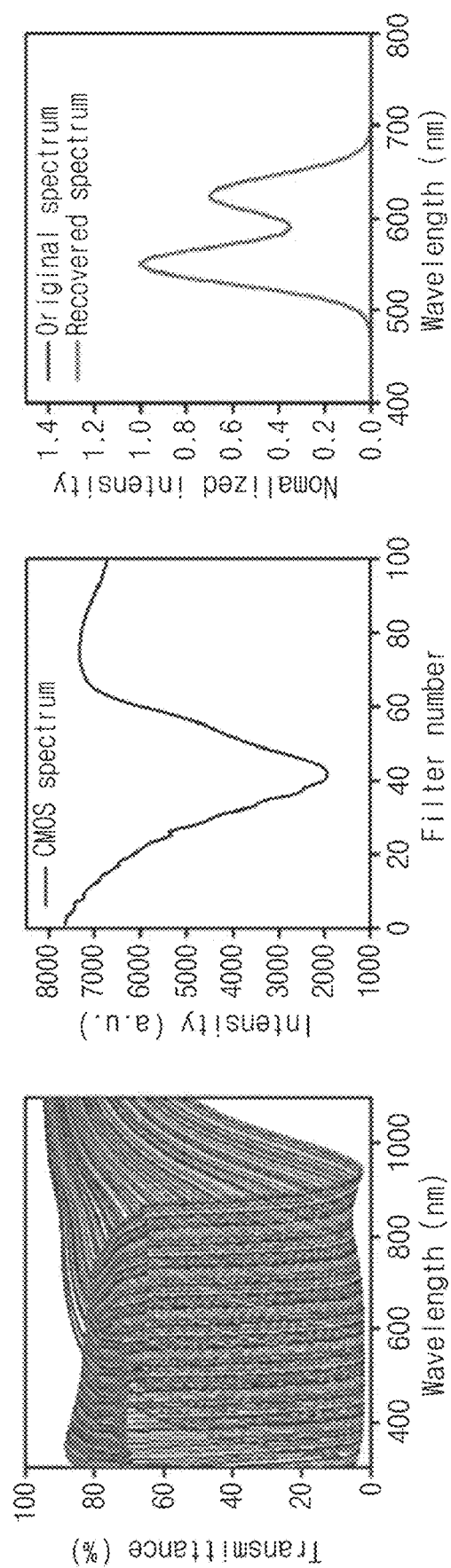

FIGS. 18 and 19 are graphs for comparing the transmission band-type filter array and the stop band-type filter array in a visible-near-infrared wavelength band. A calculation example for explaining the difference in the signal acquisition and spectrum restoration process in the spectrometer using the transmission band-type filter array and the stop band-type filter array is shown.

As the transmission band type and the stop band type filter, an Al nano-hole array and an Al nano-disk array were selected, and the transmission spectrum according to the grating period change was calculated using the FDTD computer simulation method. In both cases, a hexagonal lattice structure was assumed and the period was changed from 200 nm to 700 nm at intervals of 5 nm. A glass substrate was used and the thickness of Al was equal to 50 nm and the duty cycle was fixed at 50%.

The left graph of FIG. 18 shows the filter function light transmission spectrum of a transmission band filter array composed of an Al metal nano-hole array. It may be seen that the transmission band due to the EOT phenomenon continuously varies with the period. When a transmission band-type filter array is used, the intensity signal at a specific wavelength of the target spectrum is determined from the intensity of light that is detected through a filter that forms a transmission band at the corresponding wavelength. If the half width of the transmission band filter is very narrow as in the case of the delta function, the spectrum of the target may be reproduced by directly reading out the intensity distribution detected by the center wavelength of the transmission band of the filter array.

However, when a non-ideal filter array having a half width as shown in the left graph of FIG. 19 is used, the signal distribution measured in the light detector deviates from the target spectrum and shows a considerably distorted shape due to overlapping of the transmission band between neighboring filters.

Assuming that the target spectrum is composed of two Gaussian peak functions separated from each other as shown in the right graph of FIG. 18, the intensity distribution for each filter measured in the light detector array through the filter function of FIG. 18 is shown in the center graph of FIG. 18. Although the spectrum is distorted, it is characterized by reflecting the peak function shape of the target spectrum due to the characteristics of the transmission band filter.

The light detector measurement signal is substituted into Equation (2), and the target spectrum is restored by finding the solution using the regularization technique. In the right graph of FIG. 18, the restored spectrum is shown in addition to a target spectrum. It may be confirmed that the spectral reconstruction is very good considering that the two curves are almost identical.

FIG. 19 shows a signal restoration process using a stop band filter array. The left graph of FIG. 19 shows the filter function of the stop band filter array. The intensity distribution observed in the light detector array as passing through the stop band filter array for the same target spectrum as in FIG. 18 is the same as the center curve in FIG. 19. Contrary to the case of using a transmission band filter, it may be seen that the peak function of the target spectrum appears in the light detector in the form of a reverse dip curve. That is, the signal measured in the light detector through the stop band filter array is characterized by showing the reverse intensity distribution as opposed to the case of the transmission band filter array. The right graph of FIG. 19 confirms that the spectral restoration by the digital signal processing algorithm is well performed even in the case of the stop band filter array.

Figure 20:
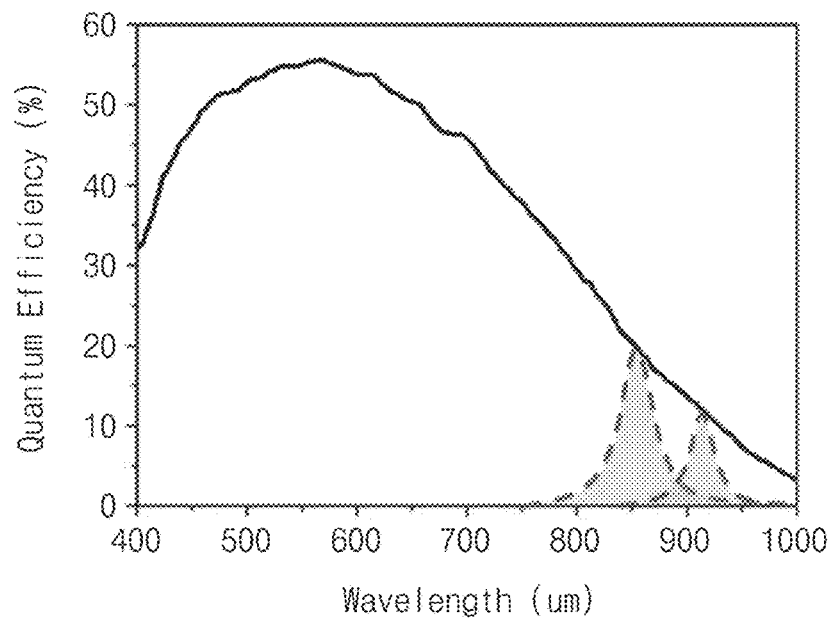
FIG. 20 is a schematic diagram for explaining the gain in terms of the spectral signal detection limit with respect to the transmission band-type filter array when the stop band type filter array is used according to the present invention.

FIG. 20 is a schematic diagram for explaining the gain in terms of the spectral signal detection limit with respect to the transmission band-type filter array in the wavelength range where the intensity of the light source or the sensitivity index of the light detector is lower when the stop band type filter array is used according to the present invention.

For convenience of explanation, FIG. 20 shows the sensitivity index by wavelength of a typical Si-CMOS image sensor. It may be seen that the quantum efficiency rapidly decreases toward the near-infrared wavelength band where the natural vibration mode of the chemical molecule is observed due to the characteristic of the energy band structure of the Si semiconductor. Therefore, if a transmission band-type filter array is used in this section, spectrum analysis becomes very difficult due to the detection limit of the detection element.

On the other hand, since the stop band blocks the light of the designed central wavelength band and transmits the light of the remaining band, the target signal information for the corresponding wavelength has a characteristic of tracking backward from the transmission intensity distribution in the neighboring wavelength band. Therefore, even in the near-infrared section where the sensitivity index of the detection element itself is very low as in the case of a Si-CMOS image sensor, the signal analysis is determined by analogy from the light intensity distribution in the other wavelength band instead of the light intensity detected in the corresponding wavelength band. Therefore, it is possible to obtain a large gain in terms of the operating band expandability and detection limit.

Figure 21:
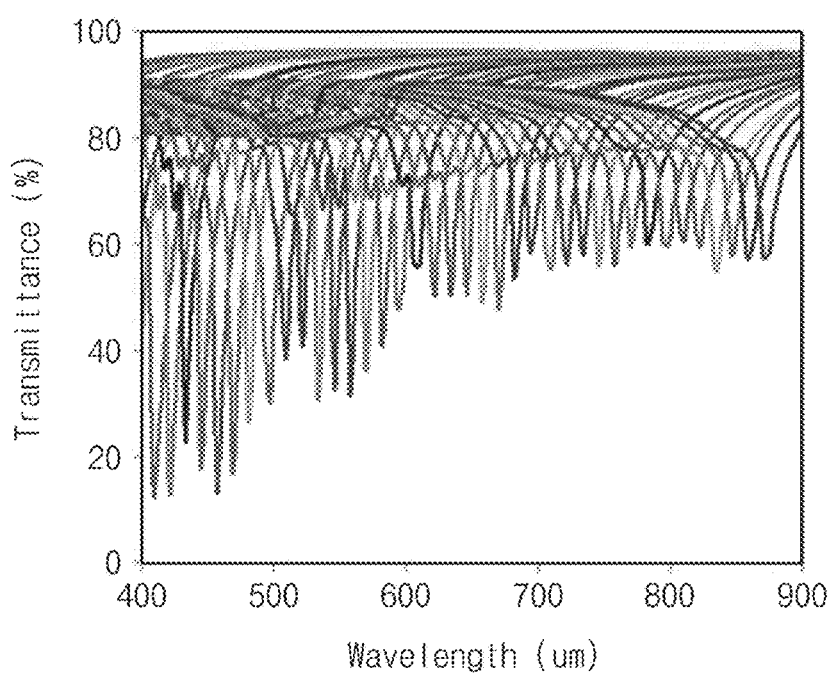
FIGS. 21 and 22 show graphs of functions restored by changing duty cycles in a metal nano-disk array filter.
Figure 22:
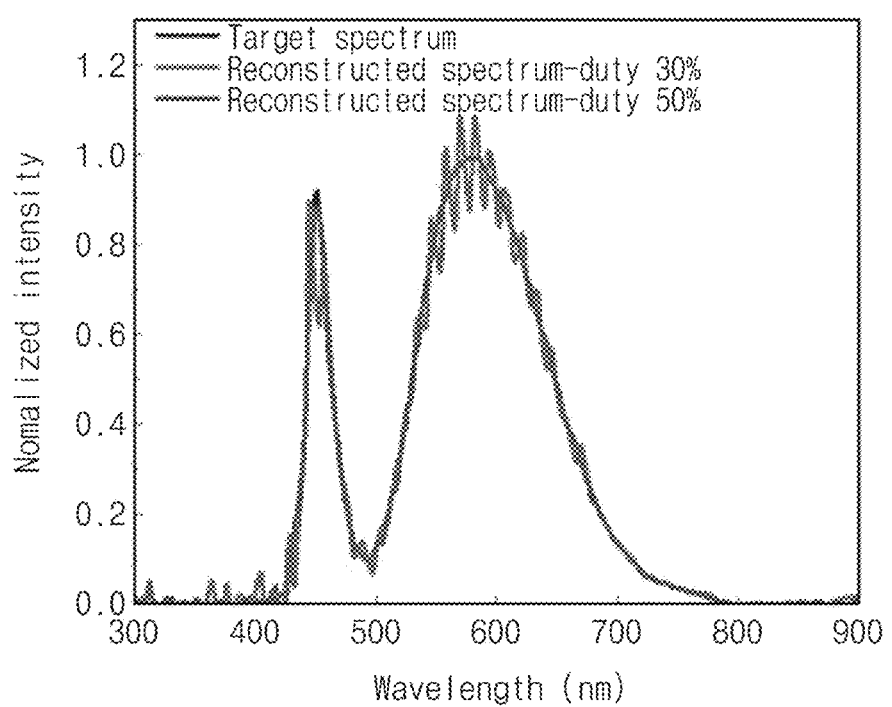

FIG. 21 shows the calculated filter function when the duty cycle is reduced to 30% and the number of filters is reduced to 50 in the Al nano-disk array filter as shown in FIG. 19. FIG. 22 shows a graph of the restored function when the duty cycle is 30% and 50% in the Al nano-disk array filter.

Referring to FIG. 21, it may be seen that as the duty cycle decreases, the modulation depth of the stop band dip becomes shallow, and the line width becomes narrow and sharp. In this case, the degree of overlap of the stop band curves between neighboring filters is reduced. When the duty cycle is 50%, overlap between neighboring filters is more than 80% due to the effect of widening the band line width even when the number of filters is 50. As a result of spectral reconstruction using the spectrum of the white LED light source as a target in both cases, when the overlap level is low and the duty cycle is 30%, the restored spectrum is accompanied by a lot of noise signals, and if the duty cycle is 50%, it may be confirmed that the spectral reconstruction is satisfactorily performed without noise. Spectral reconstruction resolution in a filter array based spectrometer is known to be improved as the filter bandwidth is narrower and the number of filters used increases. However, even if the bandwidth of the filter function is narrow, when the overlap between neighboring filters is small, the signal restoration becomes worse than the case of using a filter with a wide bandwidth.

Figure 23:
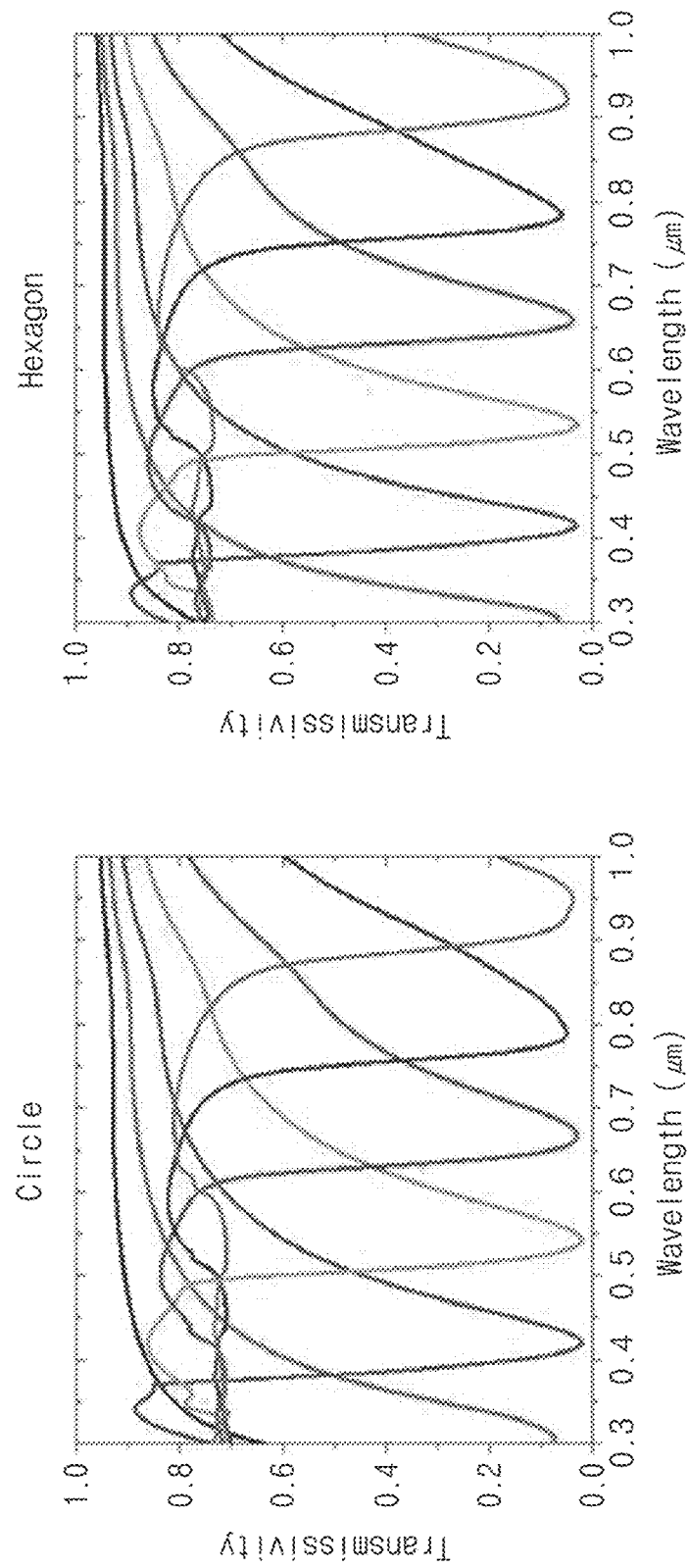
FIG. 23 is a graph comparing spectral changes according to a nano-disk shape in a filter of a nano-disk array structure having a circle and a hexagonal lattice structure.

FIG. 23 is a graph comparing spectral changes according to a nano-disk shape in a filter of a nano-disk array structure having a hexagonal lattice structure. FIG. 23 shows only the calculation results for the circular and hexagonal disk structures. However, if the disks have an isotropic symmetric structure and a similar duty cycle, the filter spectrum shows almost the same filter spectrum regardless of a shape such as a cross-shaped disk as well as the polygonal structure.

Figure 24:
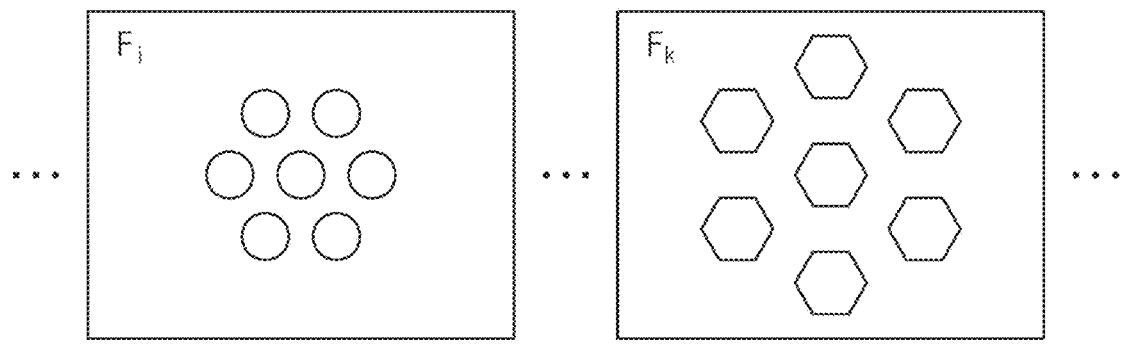
FIG. 24 shows an example in which a spectral filter array is constructed by mixing with disk arrays having two or more shapes.

This is because when the metal nano-disk array becomes a periodic lattice structure, its central wavelength and light spectrum are dominantly dependent on the grating period. As a result, it is possible to use a disk structure of a single shape in the process of forming the filter array, or to mix the disk arrays having two or more shapes as shown in FIG. 24. FIG. 24 shows an example in which a spectral filter array is configured by mixing with disk arrays having two or more shapes. Such a mixed structure has the effect of providing a process convenience by reducing the process complexity for manufacturing a circular disk and shortening the process time while manufacturing a filter array.

Figure 25:
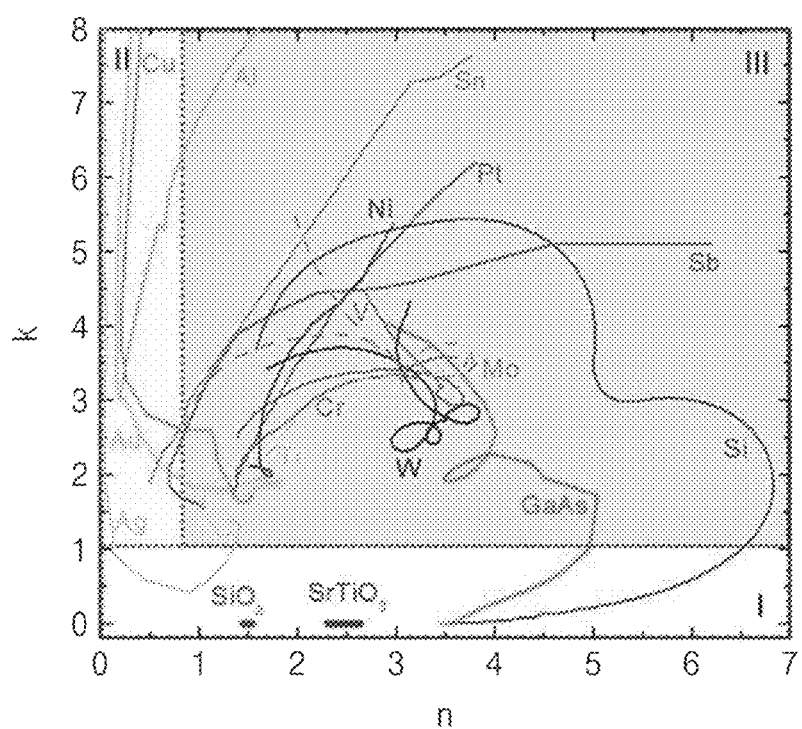
FIG. 25 is a graph showing optical constant dispersion characteristics for each metal, dielectric, and semiconductor material as a distribution of an absorption ratio with respect to a refractive index.

FIG. 25 is a graph showing optical constant dispersion characteristics for each metal, dielectric, and semiconductor material as a distribution of an absorption rate with respect to a refractive index. The complex optical constant value from the infrared band to a 1300 nm wavelength range, which is the near-infrared band, is shown on the two-dimensional coordinates. The characteristics of the optical constant combination may be largely divided into three zones. First, the zone labeled I is characterized by the absorption rate, which is the imaginary term of the complex index of refraction, less than 1 and converging to 0, and most optically transparent dielectrics correspond thereto. Semiconductor materials belong to this group in the wavelength region where the wavelength of light is smaller than the band gap.

The zone II is characterized in showing a refractive index value of less than 1 or close to 0, as opposed to the zone I, and a precious metal material with a low loss and high reflectivity, which is widely used as a plasmonic metal, is representative. On the other hand, the zone III is a region where the refractive index and absorption rate are both equal to or more than a certain value, and most of light absorbing metals and semiconductor materials in the wavelength band below the band gap correspond to this region. Materials for the zone III may be used as materials for the nano-disk array structure for implementing the stop band filter array according to the present invention. Light absorbing metal materials include Cr, Ni, Ti, Pt, Sn, Sb, Mo, W, V, Ta, Te, Ge, Si, and the like, and alloys between these metals and silicide, carbide, nitride, and sulfide containing these metals may be used without distinction if the distribution of the refractive index and the absorption rate satisfies the condition of the zone III in the operating wavelength band.

Figure 26:
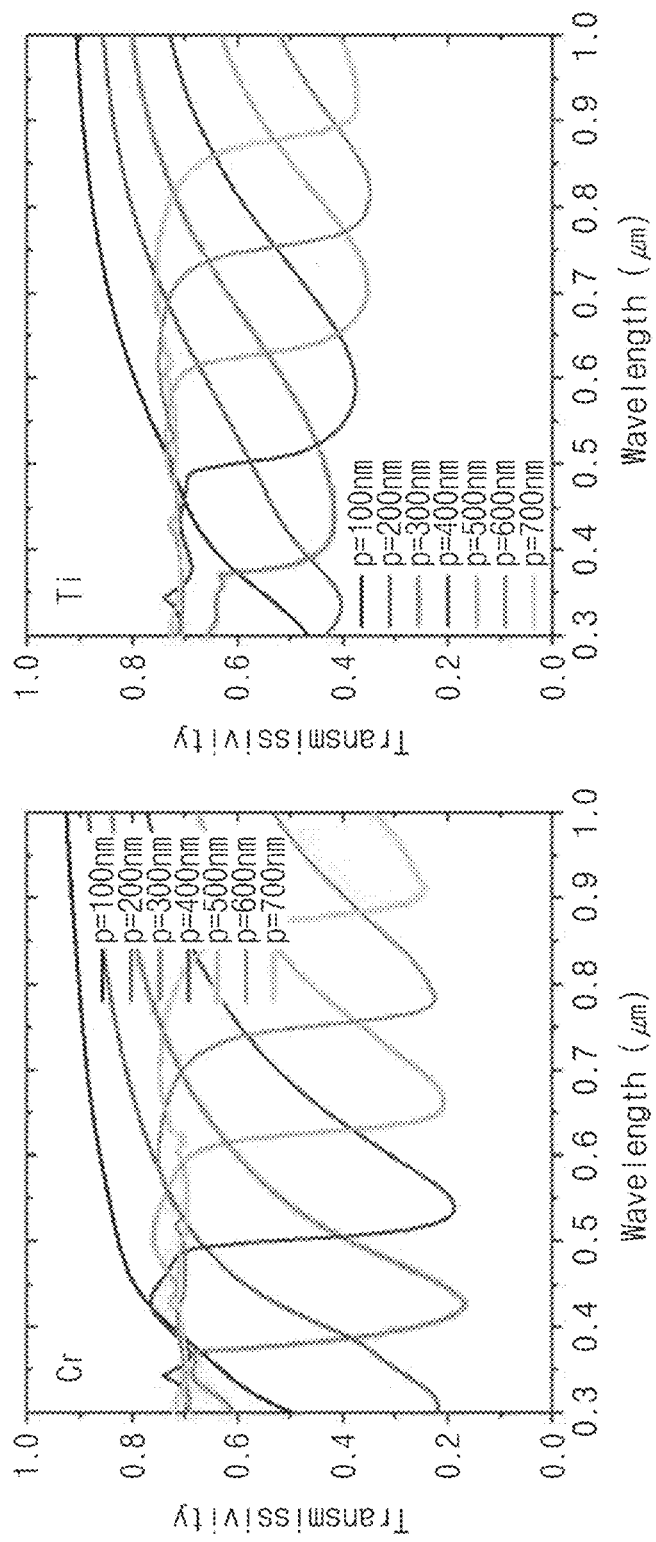
FIG. 26 is a light transmittance spectrum calculated in a visible-near-infrared band by forming a nano-disk array having a hexagonal lattice structure using Cr and Ti.

FIG. 26 is a light transmittance spectrum calculated in a visible-near-infrared band by forming a nano-disk array having a hexagonal lattice structure using Cr and Ti. In addition to the plasmonic material represented by a general low-loss precious metal material, a hexagonal lattice structure nano-disk array is formed using absorptive metal materials such as Cr and Ti, and the optical transmittance spectrum calculated from the visible-near-infrared band was obtained by a computer simulation method. In comparison with the Al nano-disk array of FIG. 17, the modulation depth is relatively small and the line width is widened. However, since the stop band formation is distinctive and the wavelength tunability according to the grating period is continuous and clear, it may be used as a filter array for spectrometer.

Figure 27:
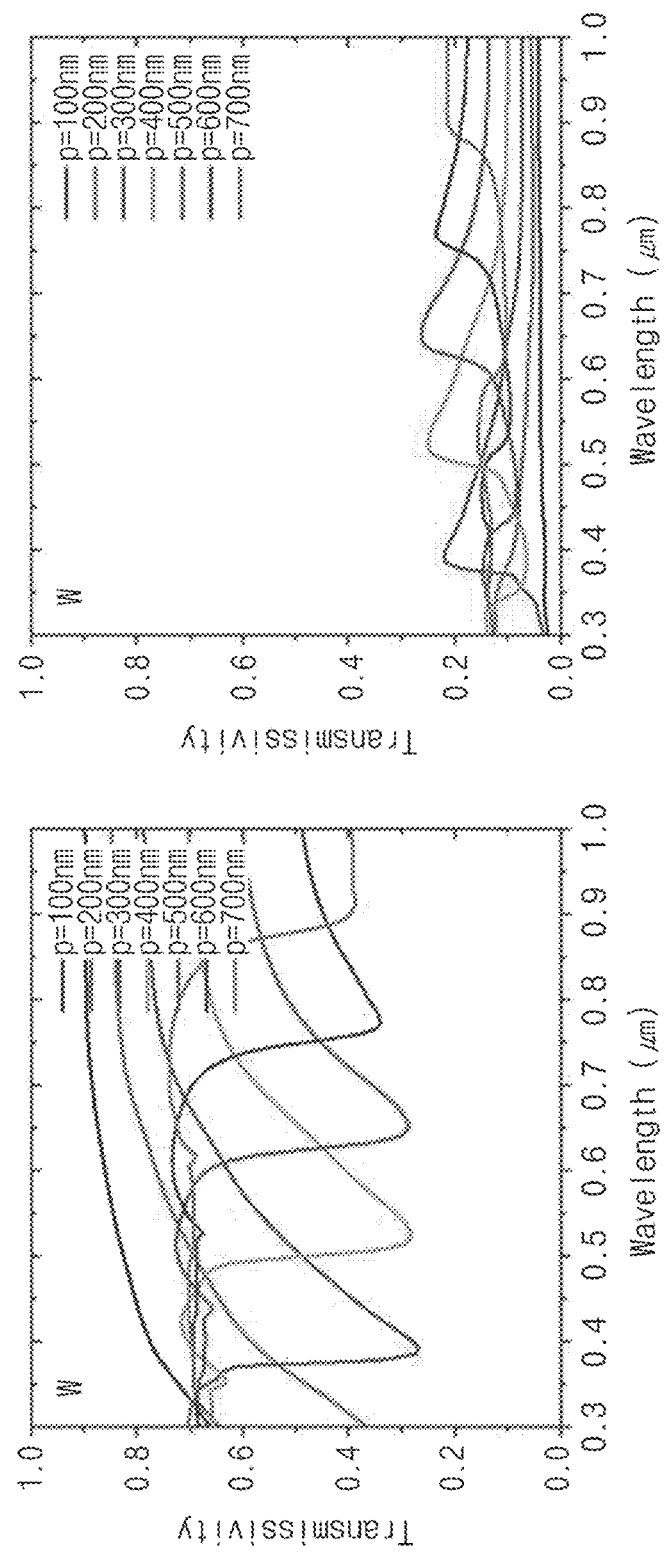
FIG. 27 is a graph of light transmittance and light reflectance of a nano-disk array calculated using tungsten W.

FIG. 27 is a graph of light transmittance and light reflectance of a nano-disk array calculated using tungsten W. Tungsten W is a commonly used material in semiconductor processing. When examining the light transmittance and the light reflectivity of the nano-disk array calculated using tungsten W, unlike low loss plasmonic metal materials, it may be confirmed that the reflectance peak curves are greatly attenuated due to the optical loss of the material itself, but the stop band curves on the transmission curves are shown very clearly due to the increased light absorption effect. Such a feature may be advantageous in terms of suppressing unnecessary noise components due to reflected light when a spectrometer chip is implemented.

Figure 28:
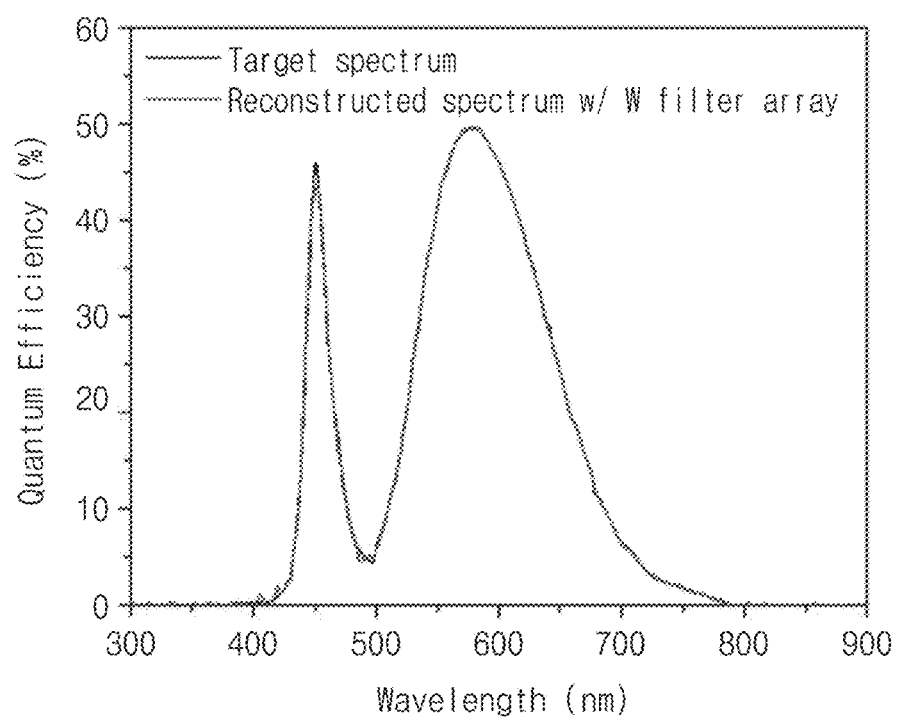
FIG. 28 is a graph of testing spectrum restoration capability when a nano-disk array of tungsten of FIG. 26 is fabricated using a stop band filter array and a digital signal processing algorithm is applied.

FIG. 28 is a graph of testing spectrum restoration capability when a nano-disk array of tungsten of FIG. 26 is fabricated using a stop band filter array and a digital signal processing algorithm is applied. Spectral restoration capability was tested by applying a digital signal processing algorithm using a stop band filter array composed of 100 filters in the lattice period from 200 nm to 700 nm. Assuming a white LED spectrum as the target, as in the case of using the Al nano-disk array filter of FIG. 20, it may be confirmed that the spectral reconstruction is comparatively excellent. This demonstrates that light absorbing metal materials may also be used as a stop band filter material in a nano-disk array structure for implementation of a transmission-type on-chip spectrometer.

Although the preferred embodiments of the spectrometer according to the present invention have been described, the present invention is not limited thereto. However, it may be variously modified and embodied within the scope of the claims, the detailed description of the invention, and the accompanying drawings. This also belongs to the present invention.

The invention claimed is:
1. A spectrometer comprising:
   a first unit spectral filter including a nano-disk array structure configured to absorb or reflect light in a part of a wavelength band of a light spectrum of an incident target;

a second unit spectral filter including a nano-disk array structure configured to absorb or reflect light in a wavelength band different from the part of the wavelength band;

a first light detector configured to detect a first light spectrum passing through the first unit spectral filter;

a second light detector configured to detect a second light spectrum passing through the second unit spectral filter; and a processing unit configured to perform a function of restoring a light spectrum of the target incident from spectra of light detected from the first light detector and the second light detector, wherein the first unit spectral filter and the second unit spectral filter each have a duty cycle between 30% and 80%, wherein the first unit spectral filter and the second unit spectral filter are configured to form stop band filters by coupling with localized surface plasmons and to pass the light with an intensity distribution as a reverse dip curve to the first light detector and the second light detector.

2. The spectrometer of claim 1, wherein the nano-disk array structure of the first unit spectral filter and the nano-disk array structure of the second unit spectral filter comprise periodically arranged metal patterns with a predetermined shape.

3. The spectrometer of claim 2, wherein the metal patterns of the first unit spectral filter and the metal patterns of the second unit spectral filter have different periods.

4. The spectrometer of claim 2, wherein the first light detector and the second light detector each comprise at least one light detection pixel of a CMOS image sensor.

5. The spectrometer of claim 2, wherein the metal patterns are composed of a material selected from the group consisting of Au, Ag, Al, Cu, or an alloy containing at least one thereof.

6. The spectrometer of claim 2, wherein the metal patterns are composed of at least one selected from the group consisting of Cr, Ni, Ti, Pt, Sn, Sb, Mo, W, V, Ta, Te, Ge, and Si, whose light absorption rate and refractive index are high in a visible light and near-infrared band, or an alloy containing at least one thereof.

7. The spectrometer of claim 2, wherein the metal patterns are composed of at least one selected from the group consisting of Ta, W, Mo, Ni, Cr, TiN, and TiON, whose optical behaviors in a mid-infrared band follow the Drude free electronic model.

8. The spectrometer of claim 2, wherein the nano-disk array structures are composed of at least a double layer and laminate a low loss high reflectivity metal material and a light absorbing metal material.

9. The spectrometer of claim 8, wherein the low loss high reflectivity metal material is selected from among Ag, Au, Al, Mg, and an alloy thereof, and the light absorbing metal material comprises at least one of Cr, Ni, Ti, Pt, Sn, Sb, Mo, W, V, Ta, Te, Ge, and Si, an alloy thereof, and silicide, carbide, nitride, or sulfide containing these metals.

10. The spectrometer of claim 2, wherein the metal patterns of the first unit spectral filter and the metal patterns of the second unit spectral filter have the same duty cycle.

11. The spectrometer of claim 2, wherein a period of the metal patterns of the first unit spectral filter and the second unit spectral filter is between 100 nm and 800 nm.

12. The spectrometer of claim 2, wherein the first unit spectral filter and the second unit spectral filter further comprise a passivation layer, and the passivation layer is composed of a material selected from $HfO_2$, $ZrO_2$, ZnO, ZnSe, $TiO_2$, $Al_2O_3$, $SiO_x$, SOG, or an alloy containing at least thereof.

13. The spectrometer of claim 2, wherein the first unit spectral filter and the second unit spectral filter further comprise a protective layer.

14. The spectrometer of claim 13, wherein the protective layer is a silicon oxide, a silicon nitride layer, a magnesium fluoride, a calcium fluoride, a low molecular resin, or a polymer material having a low refractive index.

15. The spectrometer of claim 1, wherein the processing unit is configured to calculate an intensity of light absorbed or reflected by the first unit spectral filter from a spectrum of light of the first light detector;

calculate an intensity of light absorbed or reflected by the second unit spectral filter from a spectrum of light of the second light detector; and restore a light spectrum of the incident target from the intensity of the light absorbed or reflected by the first unit spectral filter and the second unit spectral filter.

16. A spectrum measurement method using a spectrometer, the method comprising:

entering, by a light spectrum of a target, into first and second unit spectral filters, the first and second unit spectral filters each having a nano-disk array structure with a duty cycle between 30% and 80%;

absorbing or reflecting light in a part of a wavelength band by coupling with a localized plasmon to form a stop band filter by the first unit spectral filter, and absorbing or reflecting light in a wavelength band different from the part of the wavelength band by coupling with a localized plasmon to form a stop band filter by the second unit spectral filter;

detecting, by a first light detector, a first light spectrum passing through the first unit spectral filter in a reverse dip curve distribution and detecting, by a second light detector, a second light spectrum passing through the second unit spectral filter in a reverse dip curve distribution; and reconstructing a light spectrum of the target incident from the spectra of the light detected from the first light detector and the second light detector.

17. The method of claim 16, wherein the reconstructing of the light spectrum of the target comprises:

calculating an intensity of light absorbed or reflected by the first unit spectral filter from a first light spectrum of the first light detector;

calculating an intensity of light absorbed or reflected by the second unit spectral filter from a second light spectrum of the second light detector; and restoring a spectrum of an incident light from the intensity of the light absorbed or reflected by the first unit spectral filter and the second unit spectral filter.

18. The method of claim 17, wherein the reconstructing of the light spectrum of the target uses a direct readout or regularization technique.

19. The method of claim 17, wherein the reconstructing of the light spectrum of the target is performed by substituting information on a transmission spectrum $f_i(\lambda)$ of an individual filter and a spectral sensitivity function $d_i(\lambda)$ of a light detector to an equation below and using a measured detection signal $r_i$, $$\begin{bmatrix} r_1 \\ \vdots \\ r_i \\ \vdots \\ r_M \end{bmatrix} = \begin{bmatrix} D_1(\lambda_1) & \cdots & D_1(\lambda_N) \\ \vdots & \vdots & \vdots \\ D_i(\lambda_1) & \cdots & D_i(\lambda_N) \\ \vdots & \vdots & \vdots \\ D_M(\lambda_1) & \cdots & D_M(\lambda_N) \end{bmatrix} \begin{bmatrix} s(\lambda_1) \\ s(\lambda_2) \\ \vdots \\ \vdots \\ s(\lambda_N) \end{bmatrix} + \begin{bmatrix} n_1 \\ n_2 \\ \vdots \\ \vdots \\ n_M \end{bmatrix}$$

where $D_i(l)$ is $f_i(l)d_i(l)$, and when a spectrum of a target to be analyzed is $s(\lambda)$, a transmission function of an individual filter F is $f_i(\lambda)$, noise is $n_i$, and a sensitivity function of a light detector PD is $d_i(\lambda)$, $r_i$ is a detection signal occurring when a spectrum of a target reaches a light detector through a filter.

20. A spectrometer comprising:
a first unit spectral filter including a nano-disk array structure configured to absorb or reflect light in a part of a wavelength band of a light spectrum of an incident target;
a second unit spectral filter including a nano-disk array structure configured to absorb or reflect light in a wavelength band different from the part of the wavelength band;
a first light detector configured to detect a first light spectrum passing through the first unit spectral filter;
a second light detector configured to detect a second light spectrum passing through the second unit spectral filter; and
a processing unit configured to perform a function of restoring a light spectrum of the target incident from spectra of light detected from the first light detector and the second light detector,
wherein the first unit spectral filter and the second unit spectral filter comprise
periodically arranged metal patterns with a predetermined shape, and
a passivation layer conformally covering the metal patterns, and
wherein the first unit spectral filter and the second unit spectral filter are configured to form stop band filters by coupling with localized surface plasmons and pass light with an intensity distribution as a reverse dip curve to the first light detector and the second light detector.

* * * * *